United States Patent
Serizawa et al.

[19]

[11] Patent Number: 5,828,423
[45] Date of Patent: Oct. 27, 1998

[54] MOTION VECTOR DETECTION CIRCUIT PROVIDED WITH THE PICTURE DATA MEMORY

[75] Inventors: Makoto Serizawa; Atsushi Ubukata; Akihiko Otani, all of Osaka, Japan

[73] Assignee: Matsushita Electric Industrial Co., Ltd., Osaka-fu, Japan

[21] Appl. No.: 852,184

[22] Filed: May 6, 1997

Related U.S. Application Data

[62] Division of Ser. No. 639,963, Apr. 29, 1996.

[30] Foreign Application Priority Data

May 2, 1995 [JP] Japan .................................. 7-108867

[51] Int. Cl.$^6$ ........................................................ H04N 5/14
[52] U.S. Cl. ............................ 348/699; 348/402; 348/416
[58] Field of Search ..................................... 348/699, 416, 348/402; 345/508, 517

[56] References Cited

U.S. PATENT DOCUMENTS 5,497,338  3/1996  Miyake et al. .......................... 348/699
5,576,772  11/1996  Kondo ...................................... 348/699
5,659,364  8/1997  Aoki et al. ............................... 348/699

FOREIGN PATENT DOCUMENTS

| 63-157583 | 6/1988 | Japan . |
| 1264389 | 1/1989 | Japan . |
| 340044 | 3/1991 | Japan . |
| 472884 | 3/1992 | Japan . |
| 773100 | 3/1995 | Japan . |

*Primary Examiner*—Kee M. Tung
*Attorney, Agent, or Firm*—Price, Gess & Ubell

[57] ABSTRACT

The address generation unit 166 generates a write address for each picture data to be written in the frame memory 169. The memory control unit 165 writes picture data which have the same Y address and consecutive X addresses to the first bank and the second bank alternately per one-page mode length, and further writes picture data which have the same X address and adjacent Y addresses to the different banks. The memory control unit 165 determines a minimum area which consists of an odd number of page mode lengths and includes picture data of a square area having the same Y address, and reads the determined area from the two storage areas alternately per Y address.

4 Claims, 34 Drawing Sheets search area in non-telescopic search or in inter-frame distance of 1 reference area of MB1 & MB2

(1) (2) (3) (4) (5) (6) (7) (8)

767×640→1024×512
X[9:0],Y[9:0]→Xt[9:0],Yt[8:0]

| Y[9] | Xt[9:8] | Yt[8:7] |
|---|---|---|
| 0 | X[9:8] | Y[8:7] |
| 1 | $\overline{Y[8:7]}$ | X[9:8] |

$Xt[9] = X[9] \cup Y[9]$       address conversion circuit 113

$Xt[8] = X[8] \cup Y[9]$ $Yt[8] = \overline{Y[9]}\&Y[8] \cup Y[9]\&X[9]$ $Yt[7] = \overline{Y[9]}\&Y[7] \cup Y[9]\&X[8]$ $Xt[9] = X[9] \cup Y[9]$       address conversion circuit 114

$Xt[8] = X[8] \cup Y[9]$ $Yt[8] = \overline{Y[9]}\&Y[8] \cup Y[9]\&X[9] \cup (mask)$ $Yt[7] = \overline{Y[9]}\&Y[7] \cup Y[9]\&X[8] \cup (mask)$ $(mask) = Y[9]\&Y[7] \cup Y[9]\&Y[7] \cup X[9]\&X[8]$ PAL memory area actual memory area 1920×1088→2048×1024
X[10 : 0],Y[10 : 0]→Xt[10 : 0],Yt[9 : 0]

| Y[10] | Xt[10 : 7] | Yt[9 : 6] |
|---|---|---|
| 0 | X[10 : 7] | Y[9 : 6] |
| 1 | $\overline{Y[9:6]}$ | X[10 : 7] |

X address conversion circuit 131

Y address conversion circuit 132 address conversion circuit 130

Xt[10]=X[10] ∪ Y[10]

Xt[9]=X[9] ∪ Y[10]

Xt[8]=X[8] ∪ Y[10]

Xt[7]=X[7] ∪ Y[10]

Yt[9]=$\overline{Y[10]}$&Y[9] ∪ Y[10]&X[10] ∪ (mask)

Yt[8]=$\overline{Y[10]}$&Y[8] ∪ Y[10]&X[9] ∪ (mask)

Yt[7]=$\overline{Y[10]}$&Y[7] ∪ Y[10]&X[8] ∪ (mask)

Yt[6]=$\overline{Y[10]}$&Y[6] ∪ Y[10]&X[7] ∪ (mask)

(mask)=Y[10]&Y[9] ∪ Y[10]&Y[8] ∪ Y[10]&Y[7] ∪ Y[10]&Y[6] ∪ X[10]&X[9]&X[8]&X[7]

address conversion circuit 133

MOTION VECTOR DETECTION CIRCUIT PROVIDED WITH THE PICTURE DATA MEMORY

This is a division of U.S. Ser. No. 08/639,963, filed on Apr. 29, 1996, for MOTION VECTOR DETECTION CIRCUIT PROVIDED WITH THE PICTURE DATA MEMORY.

BACKGROUND OF THE INVENTION (1) Field of the Invention

The present invention relates to picture data memory which exhibits high access efficiency in detecting motion vectors of picture data, to a motion vector detection circuit which is provided with such picture data memory, and to an address conversion circuit.

(2) Description of the Related Art

Generally, motion picture data are recorded or transmitted after being compressed in order to reduce their volume based on an inter/intra-frame motion predictive-encoding technique with motion compensation such as CCITT Recommendation H.261 system or Motion Picture Coding Experts Group (MPEG) system.

The interframe motion predictive-encoding technique with motion compensation refers to a technique for searching a frame for a picture which is highly related with a picture in another frame, and encoding the difference between these two pictures.

In the interframe motion predictive-encoding technique with motion compensation, a target frame which includes a target picture is divided into a plurality of blocks, and one of the blocks is made a search unit. On the other hand, a frame preceding or following the target frame is used as the reference frame, which is also divided into a plurality of blocks. One block which is most closely related to the search unit among all the blocks in the reference frame is selected from several blocks which are in predetermined positions. The block to be selected as is most closely related to a search unit is hereinafter referred to as a search block, and the several blocks in the predetermined positions are referred to as a search area. Then, the motion vector between the search unit and the search block is detected and encoded. In addition, the difference between the search unit and the search block is encoded.

The MPEG system also defines a bi-directional interframe motion predictive-encoding technique. In this technique, a forward motion vector between a target frame and a preceding frame, and a backward motion vector between the target frame and a following frame are detected. Then, the difference between a search unit and a search block in the preceding frame and the difference between the search unit and a search block in the following frame are found. Then, either the larger value of these differences or the mean value of them is selected, and the corresponding motion vectors are encoded.

The MPEG2 system defines an interfield motion predictive-encoding technique. In this technique, each frame is divided into a top field and a bottom field. The top field corresponds to picture data on odd-numbered scan lines and the bottom field corresponds to picture data on even-numbered scan lines in the interlaced scanning. The interfield motion predictive-encoding technique will be detailed later with reference to FIG. 5.

The following is a description on the interframe motion predictive-encoding technique. FIG. 1 is the diagrammatic sketch of a conventional picture data encoding apparatus 50 which includes a frame re-ordering unit 51, a forward motion vector detection unit 52, a backward motion vector detection unit 53, a motion vector re-ordering unit 54, and a picture data compression/encode unit 55. The frame re-ordering unit 51 stores several frames of picture data which have been pre-processed and inputted at a fixed time interval, and supplies the other units with picture data to be encoded (hereinafter target picture data) and picture data to be referred to (hereinafter reference picture data). The forward motion vector detection unit 52 detects a forward motion vector between the target picture data and the reference picture data and outputs it to the motion vector re-ordering unit 54. The backward motion vector detection unit 53, which has the same construction as the forward motion vector detection unit 52, detects a backward motion vector between the target picture data and the reference picture data and outputs it to the motion vector re-ordering unit 54. How these interframe motion vectors are detected will be detailed below with reference to FIGS. 2 and 3. The motion vector re-ordering unit 54 stores the detected motion vectors for several frames, and supplies the picture data compression/encode unit 55 with motion vector data which correspond to the target picture data outputted by the frame re-ordering unit 51. The picture data compression/encode unit 55 encodes inputted picture data by using the target picture data, the reference picture data, and the motion vector data.

There are two well-known methods of detecting interframe motion vectors: telescopic search and non-telescopic search, which determine a search area in a different manner from each other. FIGS. 2A–2C indicate these two methods. The direction of scanning pictures and the direction right crossing the scanning direction are hereinafter referred to as the horizontal direction and the vertical direction, respectively. The number of frames from a target frame to a reference frame is hereinafter referred to as an interframe distance. The lengths of a search unit in the vertical direction and the horizontal direction are hereinafter referred to as H and D, respectively. FIG. 2A shows an actual search area which includes a search block in its center in non-telescopic search or telescopic search when the interframe distance is 1 and the search block is in the same position as the search unit. FIG. 2B shows both the actual and the apparent search areas in telescopic search when the interframe distance is 2. FIG. 2C shows both the actual and the apparent search areas in telescopic search when the interframe distance is 3.

FIGS. 3A and 3B show the relationship between interframe distances and the length H in non-telescopic search and telescopic search, respectively. In non-telescopic search, the size of a search area is always the same regardless of the interframe distance. A search area consists of several blocks including a block, which is in the same position as the search unit, in the center. For example, the search area shown in FIG. 2A consists of 3H×3D including the 1H×1D block corresponding to the search unit in the center.

In telescopic search, on the other hand, a search area consists of 3H×3D as in non-telescopic search. However, since a search area moves as a picture moves along consecutive frames, the offset (the amount of movement) of a search area in the current reference frame is determined based on the motion vector detected when the interframe distance is smaller by 1. Therefore, as the interframe distance becomes larger, the apparent search area expands, and as a result, the location of the actual search area is unknown until the motion vector when the interframe distance is one smaller is detected.

The following is a specific description on the motion vector detection in the case where the interframe distance is larger than 1, with reference to FIGS. 2A and 2B. Firstly, the motion vector between a search unit and a search block is detected when the interframe distance is 1. In FIG. 2A the block at the bottom right corner is detected to be a search block, and the motion vector between this block and the search unit is detected as shown there. Then, in FIG. 2B the motion vector between a search unit and a search block when the interframe distance is 2 is detected. Here, the offset of the search area is determined from the motion vector detected when the interframe distance is 1. The block at the bottom right corner is detected to be the search block in this case, too, and the motion vector between this block and the search unit is detected as shown there. Thus, the position of the search area when the interframe distance is 2 depends on the motion vector detected when the interframe distance is 1. A search area can be positioned anywhere within the 5H×5D area.

It is known that as a search area becomes larger, a motion vector detection circuit, which corresponds to the forward motion vector detection unit 52 and the backward motion vector detection unit 53 shown in FIG. 1 can exhibit more precision motion vector detection, which contributes to the formation of highly-qualified pictures. In this point, telescopic search in which an apparent search area grows larger as an interframe distance becomes larger is superior to non-telescopic search.

However, the expansion of a search area leads to a much larger expansion of the band width required for inputting picture data of the search area. Even in non-telescopic search, when a search unit consists of 16×16 pixels and the search area consists of ±16×±16 pixels, the entire number of pixels in the search area is 48×48 pixels. This means that the amount of picture data in the search area is nine times as large as that of the search unit, so that the band width required for inputting picture data of a search area in the motion vector detection circuit is nine times larger than the band width required for inputting picture data of a search unit even in non-telescopic search.

To solve this problem, Japanese Laid-open Patent Application No. 4-53389 has suggested a motion vector detection circuit which receives picture data of a search area with a shorter band width. In this motion vector detection circuit, picture data of a search area are all stored in a cache memory, and if the search areas of adjacent search units are overlapped, then picture data of non-overlapped portion only are additionally stored in the cache memory.

FIGS. 4A–4C show the overlapped portion of the search areas of a search unit MB1 and a search unit MB2 which are adjacent to each other. FIG. 4A shows the search areas of these search units MB1 and MB2 in non-telescopic search or when the interframe distance is 1 in telescopic search. FIG. 4B shows the search areas of these search units MB1 and MB2 when the interframe distance is 2 in telescopic search, and FIG. 4C shows the search areas of these search units MB1 and MB2 when the interframe distance is 3 in telescopic search. The overlapped portions are indicated by slanted lines.

In non-telescopic search as shown in FIG. 4A the overlapped portion of the search areas of the search units MB1 and MB2 is in the same position whatever the interframe distance may be, and holds most of each search area. Therefore, the suggested motion vector detection circuit is effective in non-telescopic search.

In telescopic search, however, when the interframe distance is 2 or larger, the search units MB1 and MB2 are not necessarily given the same offset as shown in FIGS. 4B and 4C, so that the search areas of the search units MB1 and MB2 do not always overlap in the same position. In some cases, they do not even overlap at all as shown in FIG. 4C. For this reason, it is difficult for a motion vector detection circuit with telescopic search to use the picture data of the search area of a search unit as the reference picture data of the search area of an adjacent search unit.

As another method of reducing the band width required for inputting picture data of a search area, it would be possible to store in the cache memory picture data not of the actual search area but of an apparent search area when the interframe distance is the largest. In this method, when the largest interframe distance is 3, the reference picture data which are additionally inputted as a search area of a search unit when a motion vector of the next search unit is detected consists of D×7H as known from FIG. 4C. The reference picture data to be stored in the cache memory for each search unit consists of 7D×7H. If a search unit consists of 16×16 pixels and the search area consists of ±16×±16 pixels, then reference picture data for ±112×±112 pixels must be stored in the cache memory in order to detect a motion vector when the interframe distance is 3. This amount of the reference picture data is about 5.4 times as much as needed when the interframe distance is 1. This counts against achieving a large-scale integrated circuit (LSI). For this reason, non-telescopic search is preferred in motion vector detection.

However, another method of inputting reference picture data by using telescopic search is described as follows. In this method, reference picture data of the search area of each search unit are inputted every time a motion vector is detected. As is easily guessed, when motion vectors are sequentially detected starting at the case where the interframe distance is 1, the amount of reference picture data to be written/read in/from reference picture data memory within one frame time, and the amount of calculations required for detecting motion vectors within one frame time are both tremendous. These amounts are non-realistic to a motion vector detection circuit which deals with the real-time reproduction process of motion pictures with a simple construction. To solve this problem, the offset of the search area in the current reference frame is determined based on the motion vector which has been already detected, starting at the case where the interframe distance 1. In this case, telescopic search is not necessarily effective if a picture transforms along consecutive frames.

As explained above, if a search unit consists. of 16×16 pixels and a search area consists of ±16×±16 pixels, then picture data of the search area consist of ±48×±48 pixels. When input picture data have 720×480 pixels, 30 frames per second, and pixel rate of 13.5 MHz as defined in National Television System Committee (NTSC), the process time to be given for each search unit to execute a real-time motion vector detection is about $19\mu$ seconds (16×16×74 nsec). The transmission rate at which the entire reference picture data corresponding to the search unit should be inputted within the time period to the motion vector detection circuit is about 120M pixels per second or higher. This is the transmission rate necessary between the reference picture data memory and motion vector detection units in telescopic search.

As will be described later with reference to FIG. 5, in the interfield motion predictive-encoding technique, if a search unit consists of 16×16 pixels and a search area consists of ±16×±8 pixels, then reference picture data become ±48×±32 pixels per field, which corresponds to ±48×±64 pixels per frame, and as a result, the transmission rate becomes about 160M pixels per second or higher. The transmission rate necessary between the reference picture data memory and the motion vector detection units is set at 160M pixels per second in the following explanation. When the amount of picture data per pixel is 8 bits, the memory for storing picture data for one frame has to have a capacity of about 2.6 Mbits. If input picture data consist of phase alternation lines (PAL) of 720×576 pixels, 25 frames per second, and pixel rate of 13.5 MHz, then the memory must be a capacity of 3.3M bits. When High-definition television (HDT) is used, a much larger capacity is needed. Thus, a motion vector detection circuit which performs real-time process in telescopic search needs a memory with a large capacity and allows high-speed access. Although a dynamic RAM (hereinafter DRAM) is suitable to such a memory, it is difficult to reach 50 nsec or lower, which is 20 MCAS cycle per second or higher, in column address strobe (hereinafter CAS) cycle. In order to achieve a transmission rate of 160M pixels per second, a data bus must have 64 bits, even if the decrease in transmission efficiency due to re-booting time of row address strobe (hereinafter RAS) for page switch is ignored. A page switch refers to updating RAS. For this reason, the data bus must have a tremendous width.

As another problem, to avoid the decrease in the transmission efficiency due to the booting time of the RAS, it is inevitable to employ an interleave construction in which independent storage areas (banks) are accessed alternately. For example, when interleaving is executed with two banks, a data bus must have a width of as large as 128 bits.

However, if a high-speed synchronous DRAM provided with an interleave function is used, a two-bank interleave memory is formed into one chip such as Hitachi, Ltd, HM5241605 where the data bus can manage with a width of as small as 4×8=32 bits to achieve the transmission rate of 160M pixels per second.

FIG. 6 is a block diagram which shows the construction of a conventional motion vector detection circuit 56 based on MPEG. The motion vector detection circuit 56 corresponds to the forward motion vector detection unit 52 and the backward motion vector detection unit 53 shown in FIG. 1. Although the forward motion vector detection unit 52 and the backward motion vector detection unit 53 detect motion vectors per frame, the motion vector detection circuit 56 uses each field as a unit. The motion vector detection circuit 56 includes a top field reference picture data memory 57, a bottom field reference picture data memory 58, and a motion vector search unit 59. The motion vector search unit 59 is mainly composed of a cache memories 60 and 61, and a local memory 62. Target picture data and reference picture data to be inputted to the motion vector detection circuit 56 are divided into top fields and bottom fields and inputted to the top field reference picture data memory 57 and the bottom field reference picture data memory 58, respectively.

FIG. 5 shows target picture data and reference picture data in time sequence when these data have M=1 field construction of MPEG2. In FIG. 5, "I0t" refers to a top field in frame 0 with I picture structure, and "P2b" refers to a bottom field in frame 2 with P picture structure. The I picture refers to an intrafield encoded picture with no motion compensation, while the P picture refers to an interfield predictive-encoded picture with motion compensation in the forward direction. The M=1 field construction of MPEG2 indicates that the interfield distance between a P picture and an I picture or between a P picture and another P picture is 1.

The top field reference picture data memory 57 stores top fields of reference picture data. As shown in FIG. 5, top fields of reference picture data are updated when target picture data move from a top field to a bottom field. The bottom field reference picture data memory 58, which has the same construction as the top field reference picture data memory 57, stores bottom fields of reference picture data. The bottom fields of reference picture data are updated when target picture data move from a bottom field to a top field.

When a synchronous DRAM has a top field reference picture data memory and a bottom field reference picture data memory, it is necessary that picture data in each reference frame be read every 4 pixels in order to achieve the transmission rate of 160M pixels per second. Accordingly, picture data in each field must be read every 2 pixels. Consequently, the top field reference picture data memory 57 and the bottom field reference picture data memory 58 each stores picture data for two pixels in one address.

The motion vector search unit 59 generates a readout address for the top field reference picture data memory 57, and further generates a read control signal for the bottom field reference picture data memory 58, and reads reference picture data every 2 pixels, thereby detecting a motion vector for input target picture data. In addition, the motion vector search unit 59 detects motion vectors between target picture data of one field and two consecutive fields which have been inputted before the target picture data as reference picture data. For example, a motion vector between target picture data P2t and reference picture data P1t and a motion vector between target picture data P2t and reference picture data P1b are detected. When the motion vector search unit 59 detects motion vectors in real time process, the motion vectors for both the top field and the bottom field of one frame of target picture data are detected before the next frame is inputted.

The cache memory 60 has a storage area for about two search areas and stores reference picture data which are read from the top field reference picture data memory 57 and which correspond to the search area of a search unit.

The cache memory 61 has a storage area for about two search areas and stores reference picture data which are read from the bottom field reference picture data memory 58 and which correspond to the search area of a search unit. The reference picture data stored in these cache memories 60 and 61 are read under the control of the motion vector search unit 59 so as to be read in an order convenient to the motion vector detecting process.

The local memory 62 stores input target picture data.

In the above construction, it is necessary that the writing time and the reading time to/from the cache memories 60 and 61 are in good balance to meet the properties of circuits which use the cache memories 60 and 61. This is because the motion vector search unit 59 must write next reference picture data in a free storage area in the cache memory 60, for example, when it is reading picture data from the cache memory 60. This holds true to the cache memory 61, and otherwise the motion vector search unit 59 has to wait for the next reference picture data to be read in the cache memories 60 and 61, which leads to an increase in circuit operation frequencies.

As explained above, it takes the longest time in the motion vector detection process to read picture data of a search area from the reference picture data memory, which corresponds to the top field reference picture data memory 57 and the bottom field reference picture data memory 58 shown in FIG. 6. However, the reading of picture data of each search area must be finished before a motion vector for a search unit is detected even if the readout efficiency of picture data from the reference picture data memory becomes the worst. If this is impossible, the readout operation frequencies must be increased accordingly. The writing operation of picture data has the same problem.

As explained above, the reading of reference picture data to the motion vector search unit 59 must be executed at a very high speed, and it is necessary to write new reference picture data to the reference picture data memory when the reference picture data shown in FIG. 5 are updated.

For example, when the target picture data P2t shown in FIG. 5 are inputted to the local memory 62, the reference picture data P1t and P1b must be already written in the top field reference picture data memory 57 and the bottom field reference picture data memory 58, respectively. At this time, although the reference picture data P1t are already in the top field reference picture data memory 57 when the motion vector between the target picture data P1b and the reference picture data P1t is detected, the reference picture data P1t must be already written in the bottom field reference picture data memory 58 while the motion vector of the target picture data P1b is being detected while the reference picture data P0b are read from the bottom field reference picture data memory 58. When the writing of the reference picture data to the reference picture data memory and the reading from the motion vector search unit 59 are performed concurrently or on a time division basis, it is necessary to further increase the operation frequencies of the reference picture data memory, which is very inconvenient.

FIG. 7 is a block diagram of a conventional reference picture data memory 79 including buffer memories 73 and 74. The reference picture data memory 79 corresponds to the top field reference picture data memory 57 and the bottom field reference picture data memory 58 shown in FIG. 6.

The reference picture data memory 79 includes a data selector 70, first and second address selectors 71, first and second control signal selectors 72, buffer memories 73 and 74, and first and second three-state buffers 78. The motion vector search unit 59 is mainly composed of a cache memory 75, a readout address generation circuit 76, and a readout control circuit 77.

The data selector 70 outputs reference picture data which are read from the buffer memory 73 or the buffer memory 74 to the cache memory 75.

The first and second address selectors 71 are connected with the buffer memory 73 and the buffer memory 74, respectively, and receive reference picture data write addresses, and reference picture data read addresses generated by the readout address generation circuit 76, respectively. The first address selector 71 outputs a reference picture write address to the buffer memory 73 when reference picture data are written in the buffer memory 73. At the same time, the second address selector 71 outputs a readout address to the buffer memory 74.

The first selection signal selector 72 and the second selection signal selector 72 are connected with the buffer memory 73 and the buffer memory 74, respectively. These first and second control signal selectors 72 receive a reference picture write control signal and reference picture data read control signal from the readout control circuit 77, respectively. When reference picture data are written in the buffer memory 73, the first control signal selector 72 outputs a reference picture write control signal to the buffer memory 73. At the same time, the second control signal selector 72 outputs reference picture data read control signal to the buffer memory 74.

The buffer memories 73 and 74 each stores one field of reference picture data. The buffer memories 73 and 74 concurrently execute the writing and reading of reference picture data alternately every time the picture data are updated, based on the read/write addresses inputted from the first and second address selectors 71 and the read/write control signals inputted from the first and second control signal selectors 72. For example, if the intrafield encoded picture data I0t are written in the buffer memory 73 at the timing shown in FIG. 5, then the next interfield predictive-encoded picture data P0b are written in the buffer memory 74. While the interfield predictive-encoded picture data P0b are being written in the buffer memory 74, the intrafield encoded picture data I0t are read from the buffer memory 74, and accordingly, the motion vector between the interfield predictive-encoded picture data P0b and the intrafield encoded picture data I0t are detected.

The cache memory 75 stores reference picture data which are inputted as a search area from the data selector 70.

The readout address generation circuit 76 generates readout addresses of the buffer memories 73 and 74.

The readout control circuit 77 outputs read control signals of the buffer memories 73 and 74.

The first and second three-state buffers 78 drive a data bus connected with the buffer memory 73 and a data bus connected with the buffer memory 74, respectively. To be more specific, when reference picture data are written in the buffer memory 73, the first three-state buffer 78 is put in a connected state, thereby sending reference picture data to the buffer memory 73. During this, the second three-state buffer 78 is put in a disconnected state, thereby sending the reference picture data read from the buffer memory 74 to the data selector 70 via the data bus.

As described hereinbefore, while reference picture data are being sent from the buffer memory 74 to the motion vector search unit 59, new reference picture data are written in the buffer memory 73 which is not used for reading, and when reference picture data 74 are updated, picture data are read from the buffer memory 73, thereby preventing the operation frequencies of the reference picture data memory from increasing.

However, since the above-mentioned construction includes two buffer memories, not only the storage capacity of reference picture data memory is doubled, but also peripherals such as multiplexer are needed in the address system, the data system, and the control system. This causes the expansion of the circuit and an increase in the cost.

As will be detailed later with reference to FIGS. 8A–8B and 9A–9B, when reference picture data of one field or one frame are stored by distributing them to the two banks of a 2-bank interleave synchronous DRAM, and when reference picture data designated in a square area are read from the stored reference picture data, interleaving is sometimes impossible even in the high-speed synchronous DRAM if the amount of reference picture data exceeds the limit for each bank to read continuously in one page mode. In such a case, a page switch occurs in a bank, causing a wait time for the RAS booting, which leads to a decrease in the readout efficiency of the reference picture data memory. As another problem, memory cycle generated for reading picture data becomes complex depending on the positional relationship between a square area and a page border.

As will be detailed later with reference to FIGS. 10A–10B, when picture data are stored in a field memory or a frame memory such as reference picture data memory by using addresses corresponding to the NTSC format or the PAL format, some storage areas in the picture data memory are not used, which leads to a decrease in the efficiency of utilization of the picture data memory. In addition, when picture data of the NTSC format or the PAL format picture data are assigned in the free storage areas by executing address conversion, a calculation circuit for calculating multiplication is needed for the address conversion. The circuit is expanded in order to control memory, and there is more delay time for calculations.

These problems are detailed with reference to FIGS. 8A–10B as follows. FIGS. 8A and 8B show a page distribution of picture data in a field when picture data for one field are distributed to bank 0 and bank 1 of the 2-bank synchronous DRAM. Blank portions indicate picture data in a field distributed as a page of bank 0, and dotted portions indicate picture data in a field distributed as a page of bank 1. In FIG. 8A picture data in one page are distributed to the bank 0 and the bank 1 alternately by every 512 pixels in the scan direction, and in FIG. 8B picture data in one field are distributed to bank 0 and the bank 1 alternately every scan line. The square areas 80 and 81 shown in FIG. 8A are located in the same positions as the square areas 80 and 81 shown in FIG. 8B, respectively.

The unillustrated 2-bank synchronous DRAM is a 4M-bit DRAM with 16-bit input/output and two banks 0 and 1. Each of the bank 0 and the bank 1 has a storage area for 512 pages each consisting of 256 words each consisting of 16 bits. In this synchronous DRAM, when 16-bit data to be read from one address consist of 2 pixels in the horizontal direction, picture data for 512 pixels are stored in one page. If the resolution of one field in the horizontal direction is 1024 pixels, each field is assigned one page of each bank, so as to construct a field memory consisting of 1024×512 pixels by a single synchronous DRAM. Here, a page refers to a series of data which is accessible without causing an overhead such as RAS booting. For example, in FIG. 8A the left side area consisting of 512×512 pixels is stored in the bank 0 while the right side area consisting of the same number of pixels is stored in the bank 1. In this construction of picture data memory, when data on the same scan line is accessed consecutively, there is a bank switch on a page boarder, so that it is possible to read picture data from the other bank during the page switch. However, when picture data in the square areas 80 and 81 are read out, after picture data on a scan line are all read and before the reading of picture data on the next scan line is started, it is necessary to switch pages and to read picture data from the same bank. This causes a wait time to switch pages, which leads to a decrease in the readout efficiency from the DRAM.

In FIG. 8B interleaving can be executed between the bank 0 and the bank 1 to switch data reading from a scan line to the next scan line in the square areas 80 and 81, so that picture data in these squares can be read efficiently. However, in the square area 82, pages must be switched within the same bank in order to move from one scan line to the next scan line, which causes a decrease in the readout efficiency of picture data.

FIGS. 9A–9B show another page distribution of picture data in a field when picture data for one field are distributed to the bank 0 and the bank 1 of the 2-bank synchronous DRAM. Blank portions indicate picture data in a field distributed as a page of the bank 0, and dotted portions indicate picture data in a field distributed as a page of the bank 1. In FIG. 9A each field is divided into a plurality of blocks each consisting of 32×16 pixels, and distributed to the bank 0 and the bank 1, block by block in the horizontal direction alternately. In FIG. 9B each field is divided into a plurality of blocks each consisting of 64×8 pixels, and distributed to the bank 0 and the bank 1 in the same manner.

The square areas 83 and 84 shown in FIG. 9A are located in the same position as the square areas 83 and 84 shown in FIG. 9B, respectively. Since each page includes 256 words in the above-mentioned 4M-bit DRAM, the block to be read has a size of 32×16 pixels in the case shown in FIG. 9A. To improve the readout efficiency in the scan line direction, blocks adjacent to each other in the horizontal direction are distributed to different banks from each other.

In the case shown in FIG. 9A, it is assumed that picture data of a search area consisting of 48×32 pixels are read from reference picture memories where reference picture data are distributed to different banks. Then, when picture data of the square area 83 are read and pages are switched in one bank, the other bank can be used by executing interleaving, thereby increasing the readout efficiency. In contrast, when picture data of the square area 84 are read, and when the reading is moved from a scan line to the next scan line, it is necessary to switch pages in a bank, which causes a decrease in the readout efficiency.

In the case shown in FIG. 9B each block consists of 64×8 pixels to solve the problems in the square area 84. However, to read picture data of the square area 85 causes the same problem as to read picture data of the square area 81 in the case shown in FIG. 8A. That is, when the reading operation of picture data. moves from one scan line to the next scan line, it is necessary to switch pages in a bank, and as a result, the readout efficiency decreases.

FIGS. 10A–10B show an unoccupied useless storage area of a picture data memory which is used to store picture data having a predetermined data format. FIG. 10A shows the predetermined storage area of a frame memory of 1024×1024 pixels, which is used to store PAL format picture data of 720×576 pixels. FIG. 10B shows part of picture data which cannot be stored when the storage area of the frame memory is made 1024×512 pixels. As shown in FIG. 10A, when PAL format picture data are stored in a frame memory, the X address and the Y address of each pixel which are logical addresses indicative of the location of pictures can be used as the X address and the Y address in the frame memory. However, if picture data are stored in the frame memory by using the logical address as memory address, the utilization factor of the frame memory is only 40%. If the storage area of the frame memory to store one frame of PAL format picture data is reduced by half, namely, 1024×512 pixels, part of the picture data cannot be addressed in the method of generating memory addresses shown in FIG. 10B.

To use the storage area of a frame memory more effectively, it is known to address picture data one dimensionally. For example, when the resolution in the horizontal direction is 720 pixels like the PAL format picture data, picture data on the first scan line are stored in addresses 0–719, picture data on the second scan line are stored in addresses 720–1439, and picture data on (N+1)th scan line are stored immediately after the picture data on Nth scan line. In this case, picture data having the largest address in a PAL format frame is 720×576−1=414,719. Since the largest address of the frame memory corresponding to 1024×512 pixels is 524,287, all the data can be stored in a storage area half as small as the area shown in FIG. 10A.

However, when a pixel having a coordinate (x,y) whose origin is (0,0) is accessed, the generation of a memory address requires a complex calculation: (720y+x). Especially, the multiplication of 720y requires an calculation circuit for multiplication, which causes the expansion of a circuit when the address generation circuit is integrated into a gate array, and also causes delay time due to the calculations.

SUMMARY OF THE INVENTION

In view of these problems, the first object of the present invention is to provide picture data memory which reads and writes picture data efficiently, stably, and speedily with a simple construction.

The first object can be achieved by a picture data memory apparatus which includes a picture data memory consisting of a first storage area and a second storage area which are accessed independently of each other, and stores consecutive picture data alternately to the first storage area and the second storage area every predetermined length, which causes no overhead in accessing the first storage area and the second storage area. The picture memory apparatus comprises the following units: a write address generation unit for generating a write address consisting of an X address and a Y address corresponding to each pixel of picture data to be written in the picture data memory; a picture data write unit for writing picture data having a same Y address and consecutive X addresses of the predetermined length to the first storage area and the second storage area alternately, and picture data having a same X address and adjacent Y addresses to different storage areas from each other; a section specification unit for specifying a section longer than a width of a square area, consisting of a minimum odd number of the predetermined length in an address area of the write address, and including picture data having a same Y address, specification of the section being executed for every other Y address; and a section readout unit for reading picture data of the section specified by the section specification unit from the first storage area and the second storage area alternately.

In the picture data memory, picture data in a desired square area are read consecutively and efficiently within a certain time regardless of the position and size of the square area.

When the first storage area and the second storage area are two banks composed of a dynamic random access memory, the picture memory apparatus may further comprises a selection unit for selecting one of the two banks by EXCLUSIVE ORing an N-th bit from a least significant bit of an X address and a least significant bit of a Y address, the predetermined length being $2^N$, N being a natural number. The picture data write unit may comprise: a bank write unit for writing picture data of $2^N$ to a bank selected by the bank selection means. The section specification unit may comprise a readout address generation unit for generating a readout address consisting of an X address and a Y address for the specified section, and the section readout unit may read picture data of $2^N$ from the bank selected by the bank selection unit.

When the picture data memory has a capacity of storing picture data for one frame, the picture memory apparatus may further comprise the following units: a buffer for temporarily storing a predetermined amount of picture data which are inputted every square area from an input side external device at a video rate, picture data belonging to a plurality of square areas which have been requested by an output side external device to the input side external device; a transfer unit for reading picture data which belong to the plurality of square areas and which are not stored in the picture data memory from the buffer, transferring the read picture data to the picture data write unit and to the output side external device, and further transferring the picture data read by the section readout unit to the output side external device; a report unit for reporting square areas of the plurality of square areas which are already stored in the picture data memory to the section specification unit, and making the section specification unit specify the section, the picture data write unit writing the picture data transferred by the transfer unit to the picture data memory.

If the picture data memory has only to have a storage area sufficient to store picture data for one frame, the entire picture data for the frame can be written in the picture data memory while picture data for one frame are outputted by the transfer unit.

The second object of the present invention is to provide a motion vector detection circuit which performs real-time processing of motion pictures with simple construction and simple control.

The second object can be achieved by a motion vector detection circuit for, (i) when two pictures each consisting of a plurality of equal-size blocks are referred to as a target picture and a reference picture, (ii) when one of the plurality of equal-size blocks of the target picture is referred to as a search unit, and (iii) when blocks which are located in predetermined positions in the plurality of equal-size blocks of the reference picture are referred to as a search area, detecting a motion vector between the search unit and the search area. The motion vector detection circuit comprises the following units: a buffer for temporarily storing a predetermined amount of inputted picture data of the reference picture; a reference picture data memory for storing picture data corresponding to at least one reference picture; a search area determination unit for determining the search area of every search unit in a target picture, a determining operation proceeding from one block to an adjacent block in the target picture; a search area memory for storing picture data of the search area determined by the search area determination unit; a first reference picture data write unit for reading picture data of a block which belongs to the determined search area and which does not belong to a search area of a preceding search unit from the buffer and writing the read picture data to the reference picture data memory and the search area memory; a second reference picture data write unit for reading picture data of a block which belongs to the determined search area and which has already been read from the buffer as part of a search area from the reference picture data memory and writing the read picture data to the search area memory; and a motion vector detection unit for searching a search area stored in the search area memory for a block which has a smallest difference with a search unit and detecting a motion vector between the search unit and the searched block.

The motion vector detection circuit of the present invention, which does not need two buffers for data write and data read, can save space for selectors, which switch write/read control signals between two buffers. In addition, since reference picture data of a search area are sequentially written in the reference data memory by the first reference picture data write unit, and the reference picture data written in the reference picture data memory are written in the search area memory, the reference picture data memory does not have to have a large capacity. The writing operation of the reference picture data to the reference picture data memory can be completed while the picture data of the search area of the final search unit are being written in the search area memory.

The motion vector detection circuit may further comprise a first write control unit for suspending an operation of the first reference picture data write unit when a first target picture and a second target picture are consecutive in time and have a same reference picture, when a motion vector between the first target picture and the reference picture is already detected, and when a motion vector between the second target picture and the reference picture is going to be detected.

The search area determination unit may determine a search area of each search unit in the second target picture in accordance with a motion vector which has already been detected for a corresponding block in the first target picture.

The third object of the present invention is to provide an address conversion circuit which allows the motion vector detection circuit to make the best use of the storage area in the picture data memory by speedily and efficiently assigning picture data recorded in a format corresponding to a predetermined address space to a picture data memory which has an address space different from the format with a simple construction.

The third object can be achieved by an address conversion circuit for, when $p=2^{s-i} \times (2^i-k)$, $q=2^{t-j} \times (2^j+1)$, and $2^i-k \leq 2^j \times k-1$, wherein p, q, i, j, k, s, and t are positive integers, (i) mapping picture data consisting of p pixels in S direction and q pixels in T direction into a picture data memory whose capacity corresponds to $2^s$ pixels in the S direction and $2^t$ pixels in the T direction, the T direction right crossing the S direction; (ii) dividing the picture data into $2^{i-k} \times (2^j+1)$ blocks each consisting of $2^{s-i} \times 2^{t-j}$ pixels, also dividing the picture data memory into $2^i$ in the S direction and $2^j$ in the T direction, thereby obtaining $2^i \times 2^j$ blocks; and (iii) converting first addresses of $2^i-k$ blocks, the first addresses being larger than $2^t$ in the T direction into second addresses of blocks, the second address being larger than p in the S direction and smaller than $2^t$ in the T direction.

In the address conversion circuit, all the picture data having a resolution of p×q pixels can be positioned in the storage area of the picture data memory of $2^s \times 2^t$ pixels whereby using the storage area of the picture data memory efficiently.

The address conversion circuit may comprise the following units: an address generation unit for, when i=j, generating an address S[(s-1):0] which consists of s bits in the S direction and an address T[t:0] which consists of (t+1) bits in the T direction; a first selection unit for receiving a first selection signal, a first input, and a second input, and for selecting the first input when the first selection signal indicates 0, and selecting the second input when the first selection signal indicates 1; a second selection unit for receiving a second selection signal, a third input, and a fourth input, and for selecting the third input when the second selection signal indicates 0, and selecting the fourth input when the second selection signal indicates 1; a first input unit for inputting an address T[t] as the first. selection signal, an address S[(s-1):(s-i)] as the first input, and one of a reverse value of each bit of an address T[(t-1):(t-j)] and 1 of j bit as the second input to the first selection unit, the address T[t], the address S[(s-1):(s-i)], and the address T[(t-1):(t-j)] being generated by the address generation unit; a second input unit for inputting the address T[t] as the second selection signal, the address T[(t-1):(t-j)] as the third input, and the address S[(s-1):(s-i)] as the fourth input to the second selection unit; a first address output unit for outputting one of the first input and the second input that has been selected by the first selection unit as a conversion address $S_I[(s-1):(s-i)]$; and a second address output unit for outputting one of the first input and the second input that has been selected by the second selection unit as a conversion address $T_I[(t-1):(t-j)]$.

The address conversion circuit may comprise the following units: an address generation unit for, when i>j, generating an address S[(s-1):0] which consists of s bits in the S direction and an address T[t:0] which consists of (t+1) bits in the T direction; a first selection unit for receiving a first selection signal, a first input, and a second input, and for selecting the first input when the first selection signal indicates 0, and selecting the second input when the first selection signal indicates 1; a second selection unit for receiving a second selection signal, a third input, and a fourth input, and for selecting the third input when the second selection signal indicates 0, and selecting the fourth input when the second selection signal indicates 1; a third selection unit for receiving a third selection signal, a fifth input, and a sixth input, and for selecting the fifth input when the third selection signal indicates 0, and selecting the sixth input when the third selection signal indicates 1; a first input unit for inputting an address T[t] as the first selection signal, an address T[(t-1):(t-j)] as the first input, and an address S[(s-i+j-1):(s-i)] as the second input to the first selection unit, the address T[t], the address T[(t-1):(t-j)], and the address S[(s-i+j-1):(s-i)] being generated by the address generation unit; a second input unit for inputting the address T[t] as the second selection signal, an address S[(s-j-1):(s-i)] as the third input, and a reverse value of each bit of an address S[(s-1):(s-i+j)] as the fourth input to the second selection unit; a third input unit for inputting the address T[t] as the third selection signal, an address S[(s-1):(s-j)] as the fifth input, and a reverse value of each bit of the address T[(t-1):(t-j)] as the sixth input to the third selection unit; a first address output unit for outputting one of the first input and the second input that has been selected by the first selection unit as a conversion address $T_I[(t-1):(t-j)]$; a second address output unit for outputting one of the first input and the second input that has been selected by the second selection unit as a conversion address $S_I[(s-j-1):(s-j)]$; and a third address output unit for outputting one of the first input and the second input that has been selected by the third selection unit as a conversion address $S_I[(s-1):(s-j)]$.

The address conversion circuit executes address conversion operations at a high speed with a simple construction. The address conversion circuit divides an area including picture data whose addresses in the second direction grow larger than the storage area of the picture data memory into blocks in the first direction, and places the blocks in a free area in the second direction in the order of addresses in the first direction.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

EMBODIMENT 1

Figure 11:
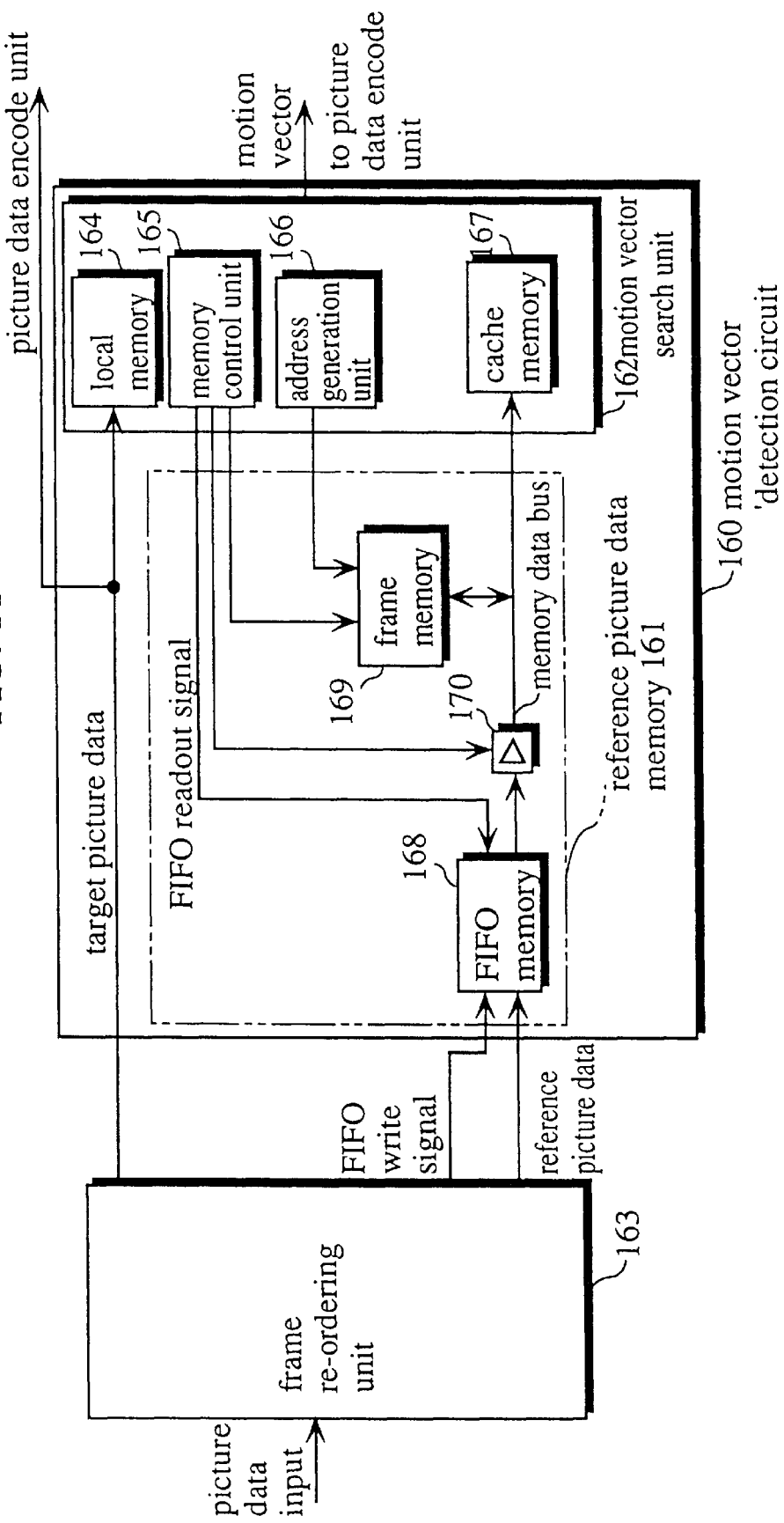
FIG. 11 is a block diagram showing part of the motion vector detection circuit 160 of the first embodiment.

The reference picture data memory and the motion vector detection circuit of the present embodiment will be described with reference to FIGS. 11 and 12. In the present embodiment, motion vectors. are detected per frame in telescopic search. FIG. 11 is a block diagram showing part of the motion vector detection circuit 160 of the present embodiment, the part corresponding to the reference picture data memory 79 and the motion vector search unit 59 shown in FIG. 7.

The motion vector detection circuit 160 includes a reference picture data memory 161 and a motion vector search unit 162. The reference picture data memory 161 includes a FIFO memory 168, a three-state buffer 170, and a frame memory 169. The motion vector search unit 162 includes a local memory 164, a memory control unit 165, an address generation unit 166, and a cache memory 167.

The motion vector search unit 162 searches the search area which has been read in the cache memory 167 for a search block so as to detect a motion vector between the search block and the search unit which has been inputted to the local memory 164, and outputs the detected motion vector to an unillustrated picture data encode unit.

The frame re-ordering unit 163 stores several frames of picture data which have been pre-processed and inputted at a fixed time interval in the same manner as the frame reordering unit 51 of the conventional picture data encoding apparatus 50, and supplies the local frame memory 164 and the picture data encode unit with target picture data. The frame re-ordering unit 163 supplies the FIFO memory 168 with the stored reference picture data along with a FIFO write signal.

The local memory 164 stores target picture data corresponding to at least one search unit.

The memory control unit 165 generates a read control signal and a write control signal to the frame memory 169. The memory control unit 165 further generates a read signal to the FIFO memory 168 in the timing of updating the reference picture data in the cache memory 167 and the frame memory 169, and transmits the generated reference picture data on a memory data bus via the three-state buffer 170. Consequently, the reference picture data on the memory data bus are supplied to the frame memory 169 and the cache memory 167. At the same time, the memory control unit 165 outputs a write control signal to the frame memory 169 to write the reference picture data in the frame memory 169.

The address generation unit 166 generates write/read addresses of the frame memory 169.

The cache memory 167 stores reference picture data of a search area corresponding to each search unit inputted to the local memory 164.

The FIFO memory 168 stores reference picture data which are read from the frame re-ordering unit 163 as a search area and which are used to update picture data in the cache memory 167 and the frame memory 169. The amount of reference picture data to be stored in the FIFO memory 168 can be as small as about two search units. Since the FIFO memory 168 updates reference picture data for one frame in one frame time, the write rate is not higher than the input rate of picture data.

The frame memory 169 stores reference picture data for one frame. The reference picture data of a search unit inputted to the local memory 164 which have not been stored in the frame memory 169 are read from the FIFO memory 168 and written in the frame memory 169.

The three-state buffer 170 is a gate circuit which operates in accordance with the control signal of the memory control unit 165. When reference picture data are read from the FIFO memory 168, the three-state buffer 170 carries the reference picture data on the memory data bus by a buffering operation. When reference picture data are read from the frame memory 169, the three-state buffer 170 is put in a high impedance state, thereby preventing the reference picture data from being carried from the FIFO memory 168 on the memory data bus.

Figure 7:
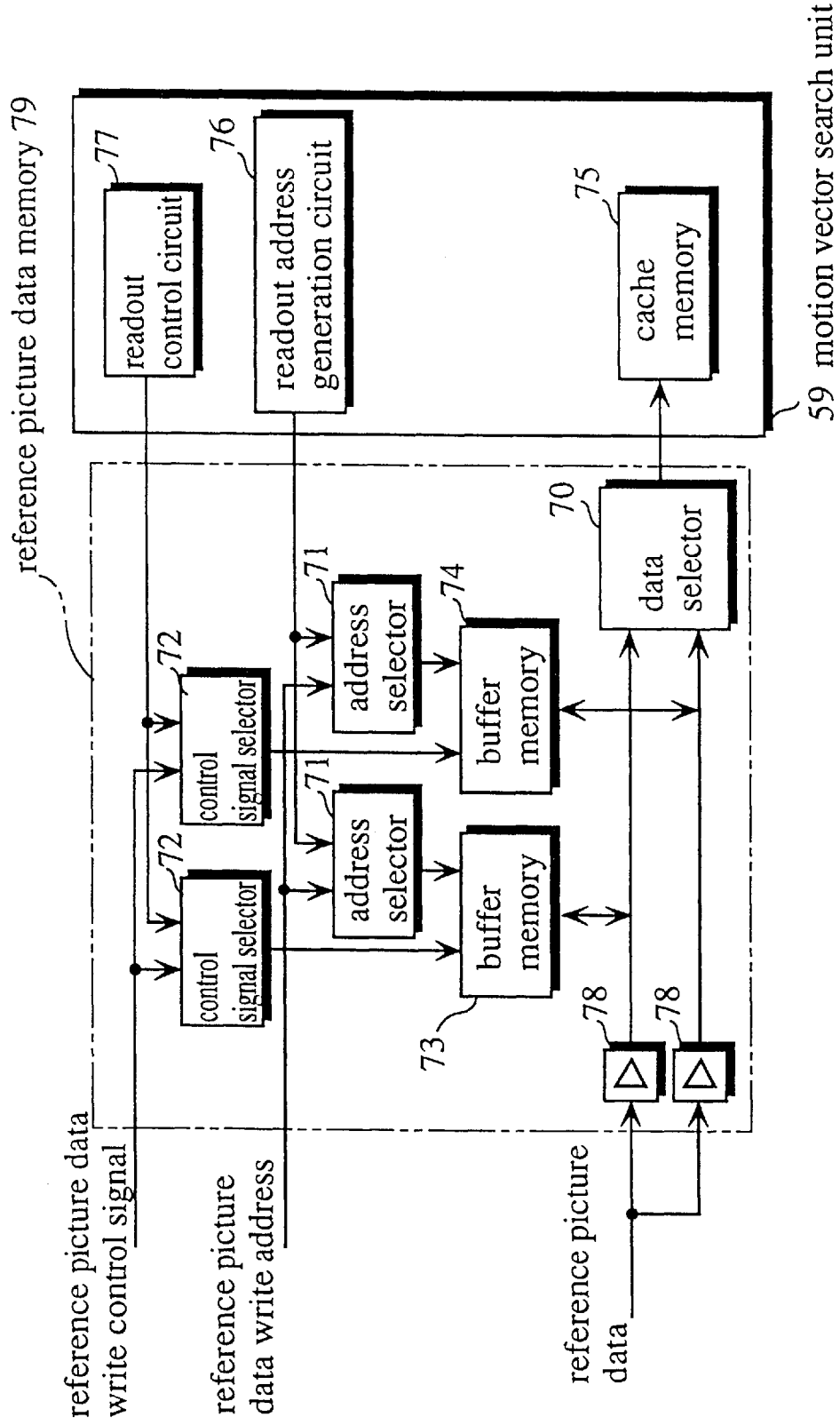
FIG. 7 is a block diagram of a conventional reference picture data memory 79 including buffer memories 73 and 74.

The difference between the reference picture data memory 161 of the present embodiment shown in FIG. 11 and the conventional reference picture data memory 79 shown in FIG. 7 is that although the reference picture data memory 161 needs the FIFO memory 168 to store reference picture data to be updated, the capacity of the frame memory 169 can be reduced by half. In addition, although the reference picture data memory 79 needs the write address generation circuit and the write memory control circuit in order to update reference picture data of the buffer memory 73 and the buffer memory 74, the reference picture data memory 161 does not need them, which leads to the simplification of the construction of the frame re-ordering unit 163. Furthermore, since the FIFO memory 168 is provided between the frame re-ordering unit 163 and the cache memory 167, it is not necessary to strictly synchronize with the update timing of the cache memory 167. In addition, since the update rate of reference picture data to the FIFO memory 168 is not higher than the input rate of picture data, the reference picture data can be transmitted at as low a speed as the frame re-ordering unit 51.

Consequently, the frame re-ordering unit 163 can have the same construction as the conventional frame re-ordering unit 51 except that an additional means for reading a square area of updated reference picture data must be provided. The data selector 70, the first and second address selectors 71, and the first and second control signal selectors 72 which are provided in the conventional motion vector detection circuit 56 are dispensable in the motion vector detection circuit 160 of the present embodiment.

Figure 12:
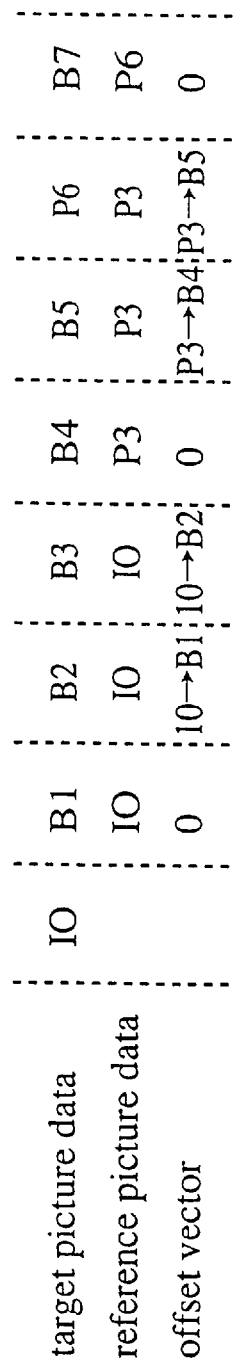
FIG. 12 shows target picture data, reference picture data, and offset vectors to be inputted to the motion vector detection circuit 160 in time sequence.

FIG. 12 shows target picture data, reference picture data, and offset vectors to be inputted to the motion vector detection circuit 160 in time sequence. In the drawing, "I0" indicates a frame 0 having I picture structure, "B1" indicates a frame 1 having B picture structure, and P3 indicates a frame 3 having P picture structure. The B picture refers to a bi-directional interframe motion predictive-encoded picture. I picture and P picture can be used as reference picture, but B picture is never used as reference picture. Since the forward motion vector between the target picture B1 and the reference picture I0 corresponds to the interframe distance 1, the offset vector of a search area in the reference picture I0 is 0.

When the target picture is B2, the interframe distance becomes 2, so that the offset vector of the search area in the reference picture I0 is generated from the forward motion vector between the reference picture I0 and the target picture B1, so as to detect a forward motion vector between reference picture I0 and the target picture B2. When the target picture is P3, the interframe distance becomes 3, so that the offset vector is generated from the motion vector between the reference picture I0 and the target picture B2, so as to detect a forward motion vector between the reference picture P3 and the target picture I0. In the same manner, when the target picture is B4, the offset vector is 0 because the motion vector of the interframe distance 1 is detected. When the target picture is B5, the interframe distance is 2, so that an offset vector is generated from the motion vector between the target picture B4 and the reference picture P3, thereby detecting a forward motion vector between the reference picture B5 and the target picture P3. When the target picture is P6, the interframe distance is 3, so that an offset vector is generated from the motion vector between the reference picture P3 and the target picture B5 so as to detect a forward motion vector between the reference picture P6 and the target picture P3.

Figure 1:
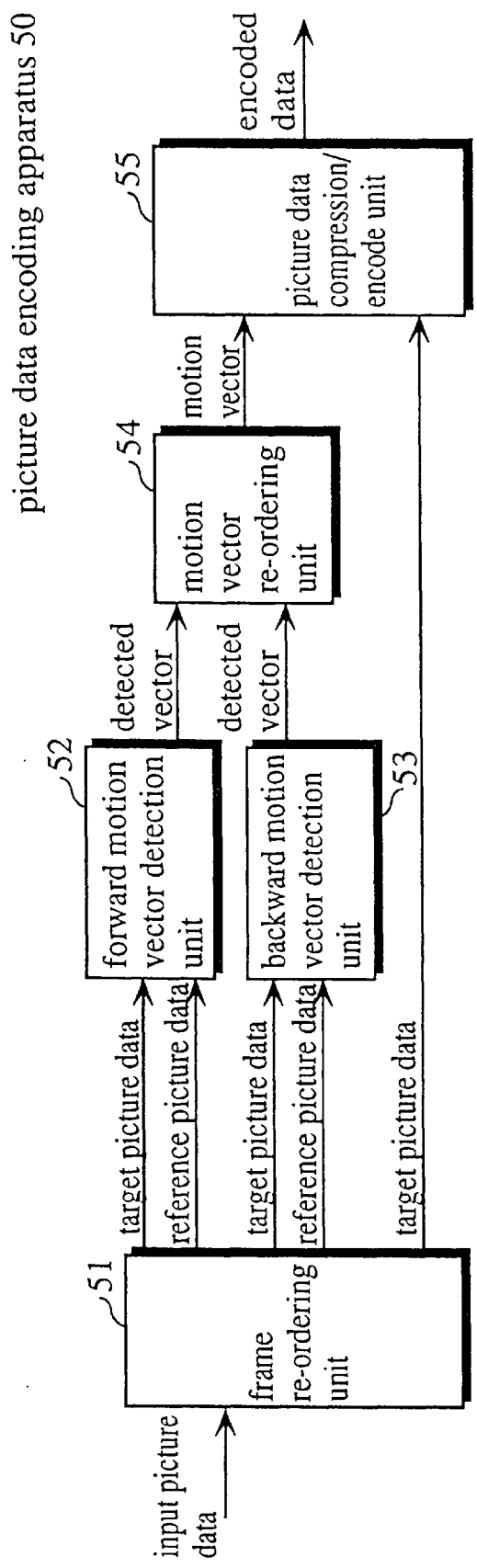
FIG. 1 is the diagrammatic sketch of a conventional picture data encoding apparatus 50.
Figure 2A:
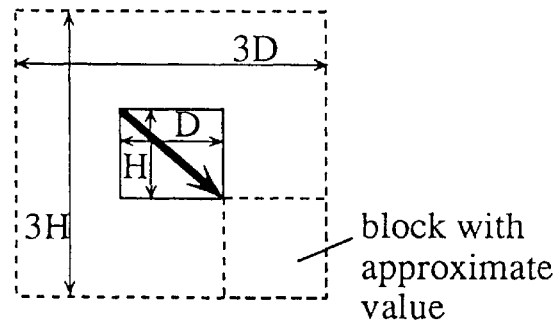
FIG. 2A shows an actual search area which includes a search block in its center in telescopic search or non-telescopic search when the interframe distance is 1 and the search block is in the same position as the search unit.
Figure 2B:
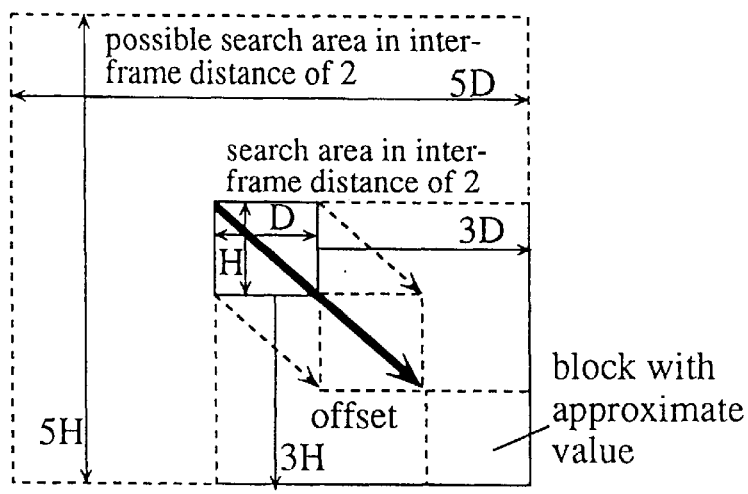
FIG. 2B shows both the actual and the apparent search areas in telescopic search when the interframe distance is 2.
Figure 2C:
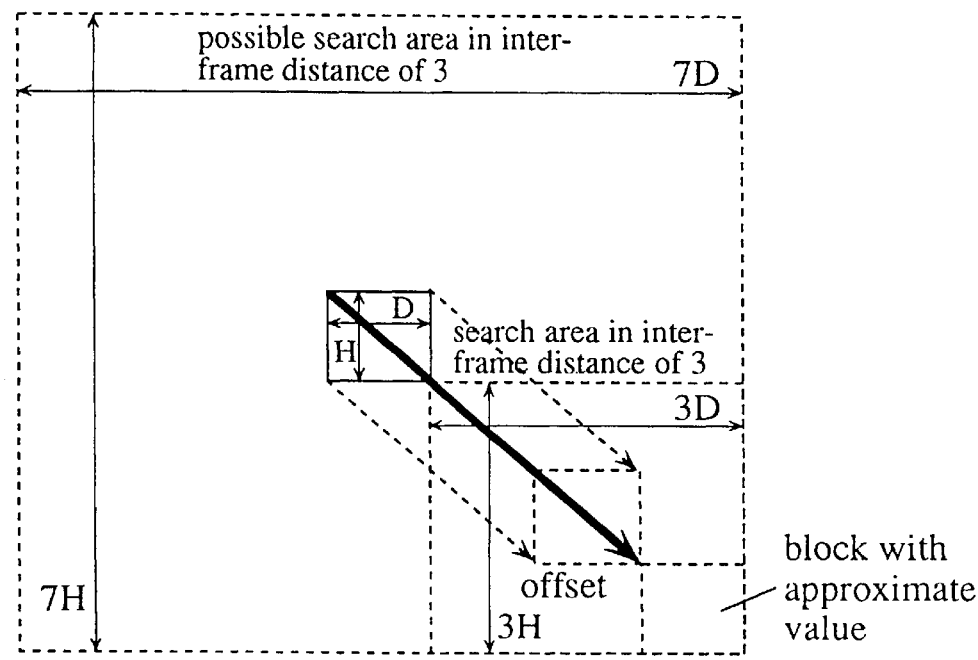
FIG. 2C shows both the actual and the apparent search areas in telescopic search when the interframe distance is 3.
Figure 3A:
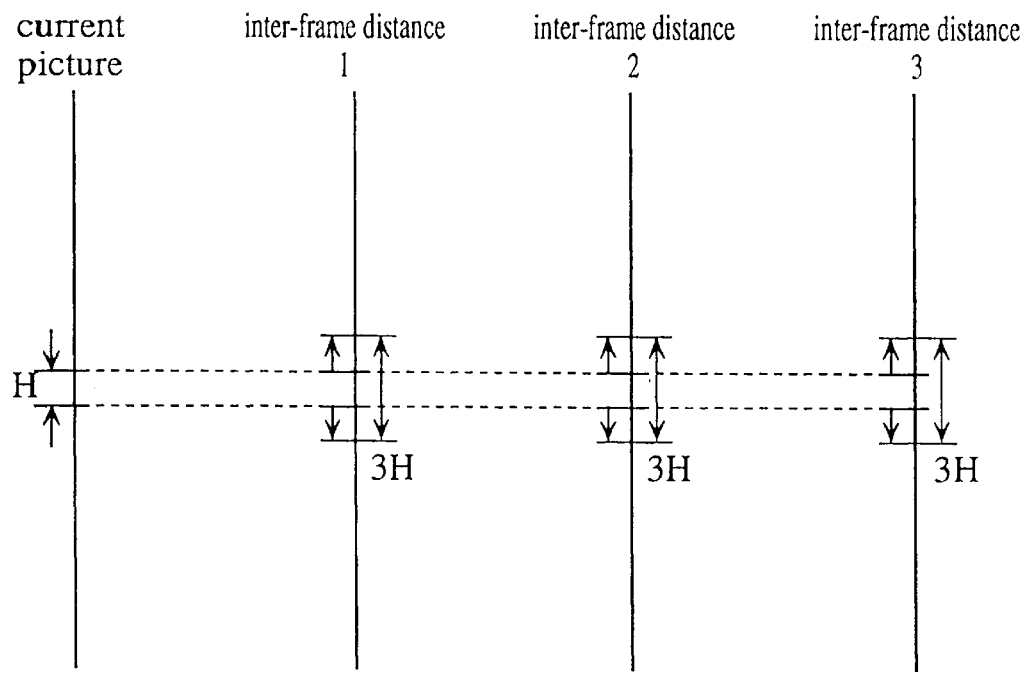
FIG. 3A shows the relationship between interframe distances and the length H in non-telescopic search.
Figure 3B:
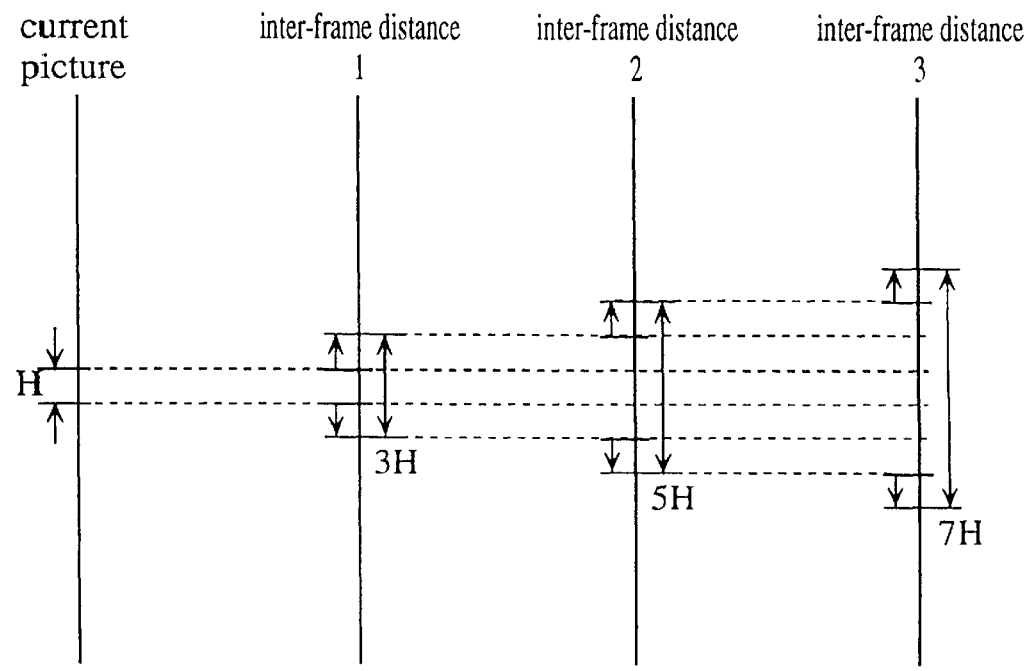
FIG. 3B shows the relationship between interframe distances and the length H in telescopic search.
Figure 4A:
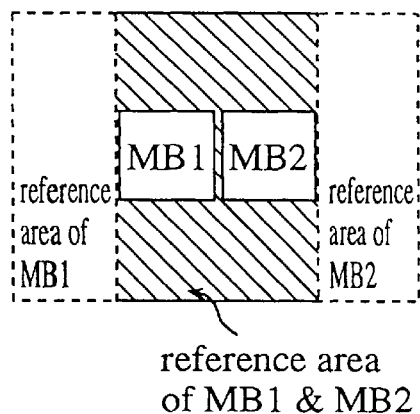
FIG. 4A shows the search areas of these search units MB1 and MB2 in non-telescopic search or when the interframe distance is 1 in telescopic search.
Figure 4B:
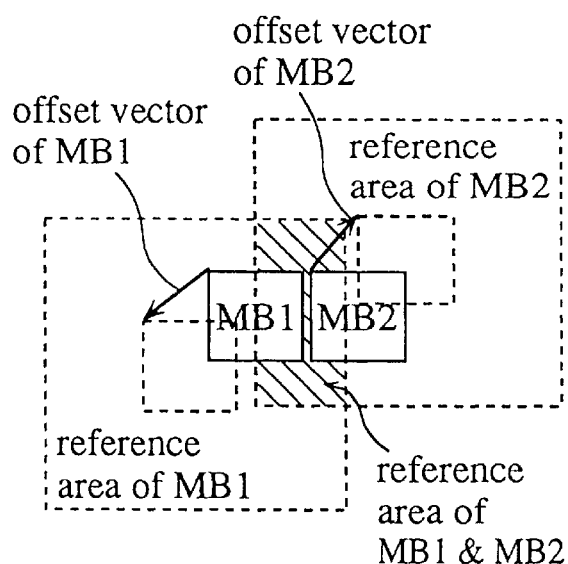
FIG. 4B shows the search areas of these search units MB1 and MB2 when the interframe distance is 2 in telescopic search.
Figure 4C:
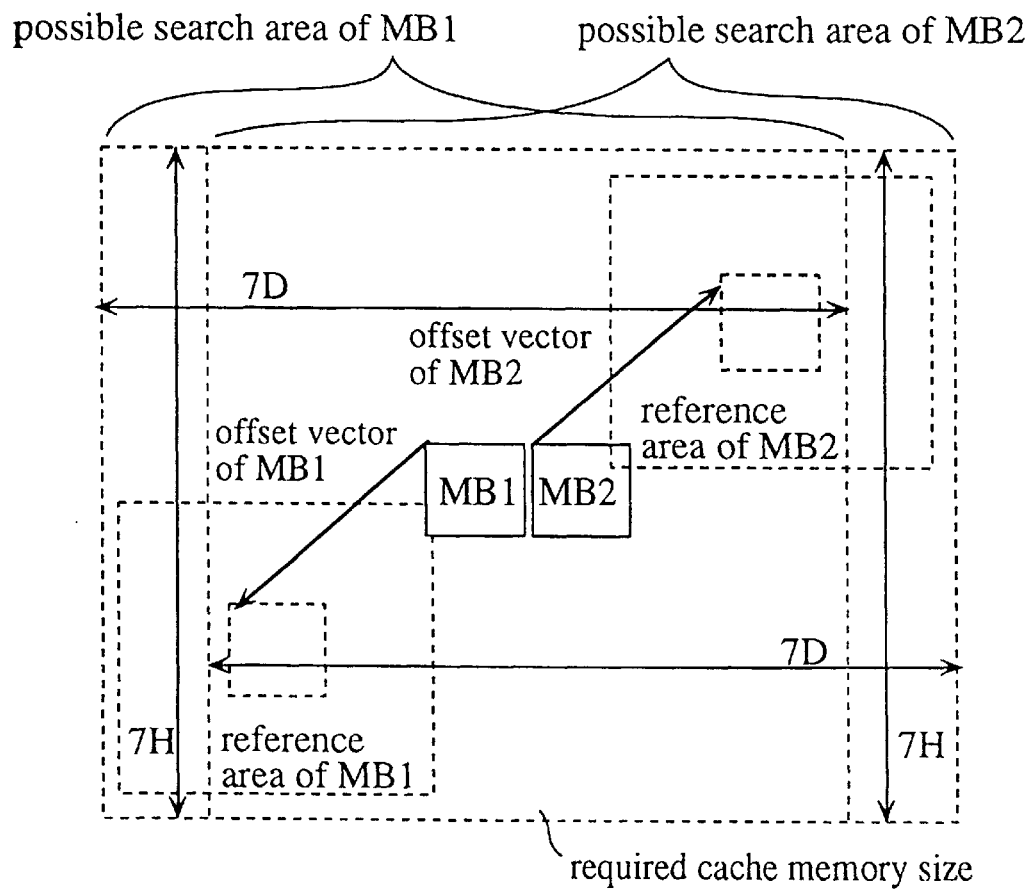
FIG. 4C shows the search areas of these search units MB1 and MB2 when the interframe distance is 3 in telescopic search.
Figure 5:
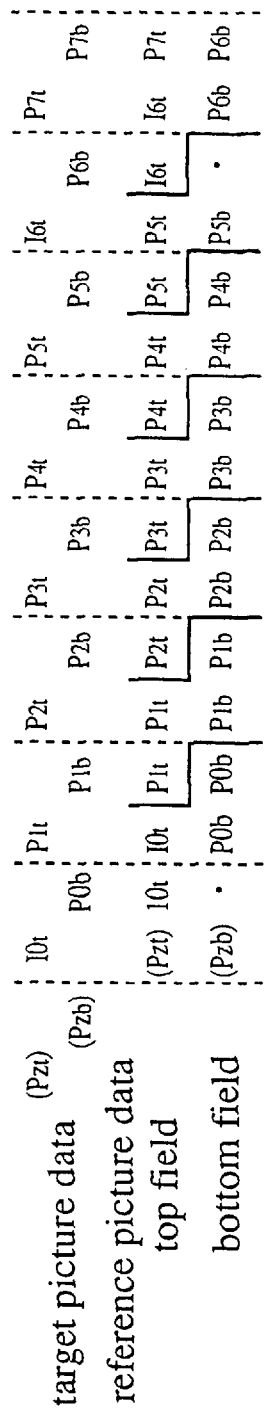
FIG. 5 shows target picture data and reference picture data in time sequence when these data have M=1 field construction of MPEG2.
Figure 6:
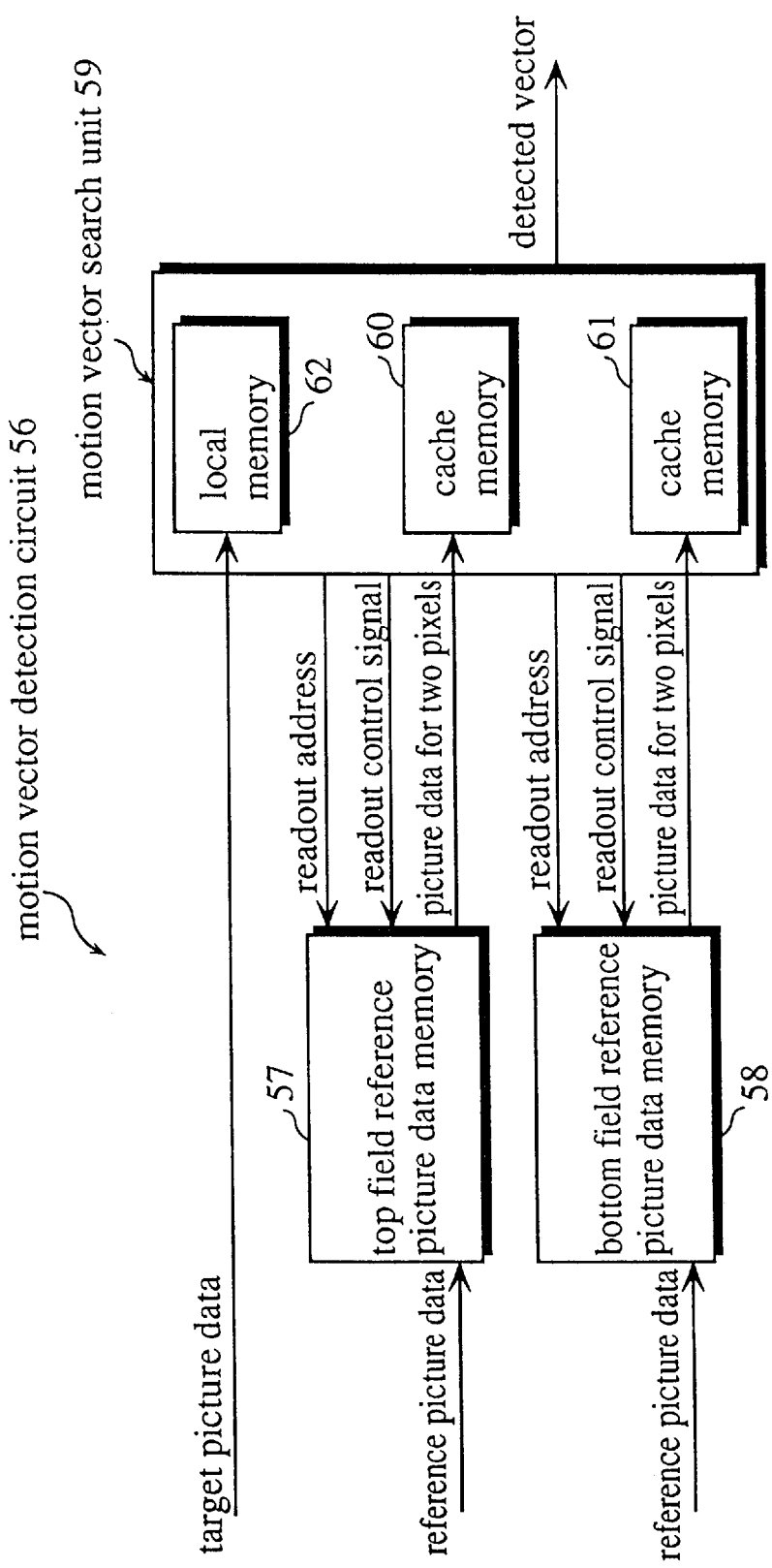
FIG. 6 is a block diagram which shows the construction of a conventional motion vector detection circuit 56 based on MPEG.

As explained hereinbefore, even in telescopic search, when the interframe distance is 1, the offset vector is 0 and the search areas of adjacent search units are largely overlapped as shown in FIG. 4A.

Figure 13B:
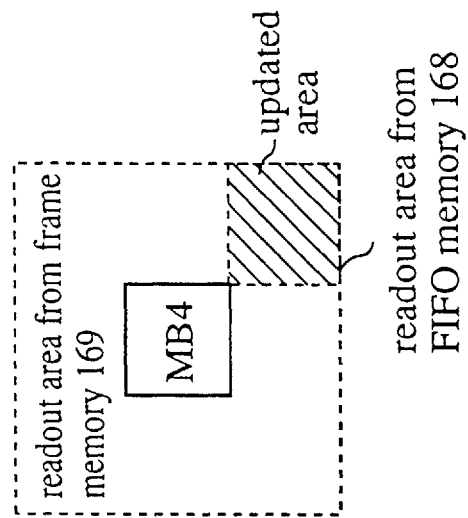
FIG. 13B shows a portion of the search area of the search unit MB4 which is newly read from the FIFO memory 168.
Figure 13A:
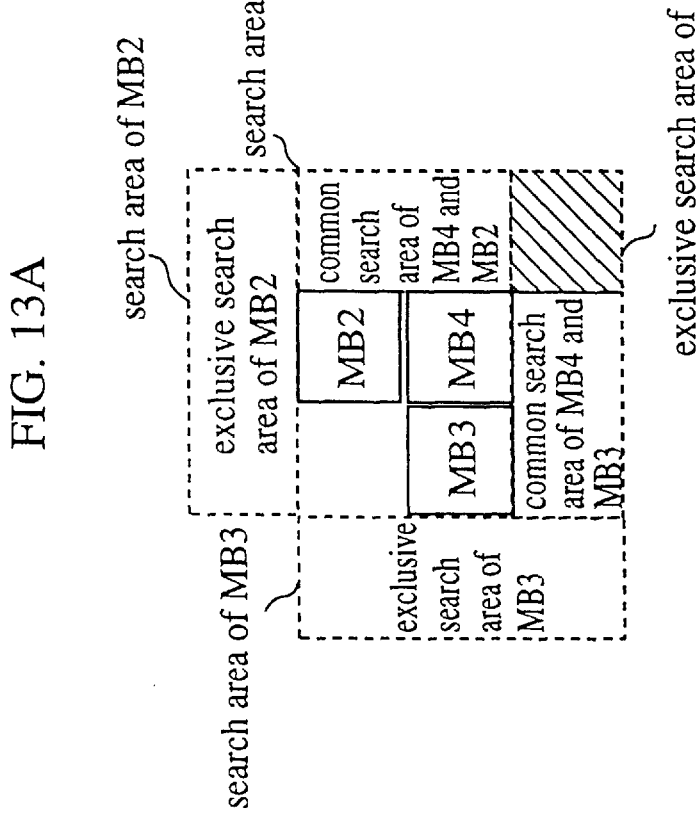
FIG. 13A shows the overlapped and non-overlapped portions between the search area of a search unit MB4 and the search area of each search unit which is adjacent to the search unit MB4 in the vertical and horizontal directions.

FIG. 13A shows the overlapped and non-overlapped portions between the search area of a search unit MB4 and the search area of each search unit which is adjacent to the search unit MB4 in the vertical and horizontal directions. The search unit MB2 and the search unit MB3 are next to the search unit MB4 in the vertical direction and the horizontal direction, respectively. The block at the right bottom corner with slanted lines corresponds to a portion of the search area of the search unit MB4 which is overlapped with neither the search area of the search unit MB2 nor the search area of the search unit MB3.

FIG. 13B shows a portion of the search area of the search unit MB4 which is newly read from the FIFO memory 168.

By using this feature, the reference picture data of the overlapped portion are read from the frame memory 169 without updating reference picture data of the frame memory 169. The other reference picture data which are not stored in the frame memory 169 are written to the frame memory 169 to update the reference picture data, thereby inputting reference picture data to the cache memory 167. That is, the motion vectors of the search unit MB2 and the search unit MB3 have already been detected and the reference picture data are already stored in the frame memory 169 at the time the motion vector of the search unit MB4 is detected. Consequently, when the motion vector between the search unit MB4 and reference picture data is detected, the reference picture data of the overlapped portion are read from the frame memory 169 to the cache memory 167. The reference picture data of search areas which precede the search unit MB4 and whose motion vectors are not detected yet are newly written to the frame memory 169 and also written to the cache memory 167.

In this manner, for example, by the time when all the motion vectors between the reference picture I0 and the target picture B1 when the interframe distance is 1 are detected, all. the reference picture data for the entire frame of the reference picture I0 are written in the frame memory 169. Consequently, when the motion vector between the reference picture I0 and the target picture B2 when the interframe distance is 2 is detected, the reference picture data of the reference picture I0 are all stored in the frame memory 169. As a result, wherever in the reference picture I0 a search area of a search unit in the target picture B2 is positioned, the reference picture data of the search area can be sent from the frame memory 169 to the cache memory 167.

In the conventional reference picture data memory 79 with double buffer structure, each of the buffer memory 73 and the buffer memory 74 needs the first and second address selectors 71 and the first and second control signal selectors 72, and a data selector 70 is needed to select picture data via either one of the first and second three-state buffers 78. Furthermore, when the reference picture data memory 79 is a field memory, each of the top field and the bottom field requires the two three-state buffers 78, and as a result, the field memory needs twice as many address selectors and control signal selectors as a frame memory.

In contrast, the frame memory 169 of the present embodiment needs only the FIFO memory 168 and the three-state buffer 170, and when the frame memory 169 is a field memory, each of a top field and a bottom field needs only the FIFO memory 168 and the state buffer 170. Consequently, the motion vector detection circuit 160 can be more compact than the motion vector detection circuit 56 provided with the reference picture data memory 79.

In the present embodiment, the motion vector detection circuit 160 detects motion vectors per frame. However, the motion vector detection circuit 160 may be designed to detect motion vectors per field by replacing the frame memory 169 with a field memory, and providing a cache memory and a field memory to each of the top field and the bottom field.

EMBODIMENT 2

Figure 14:
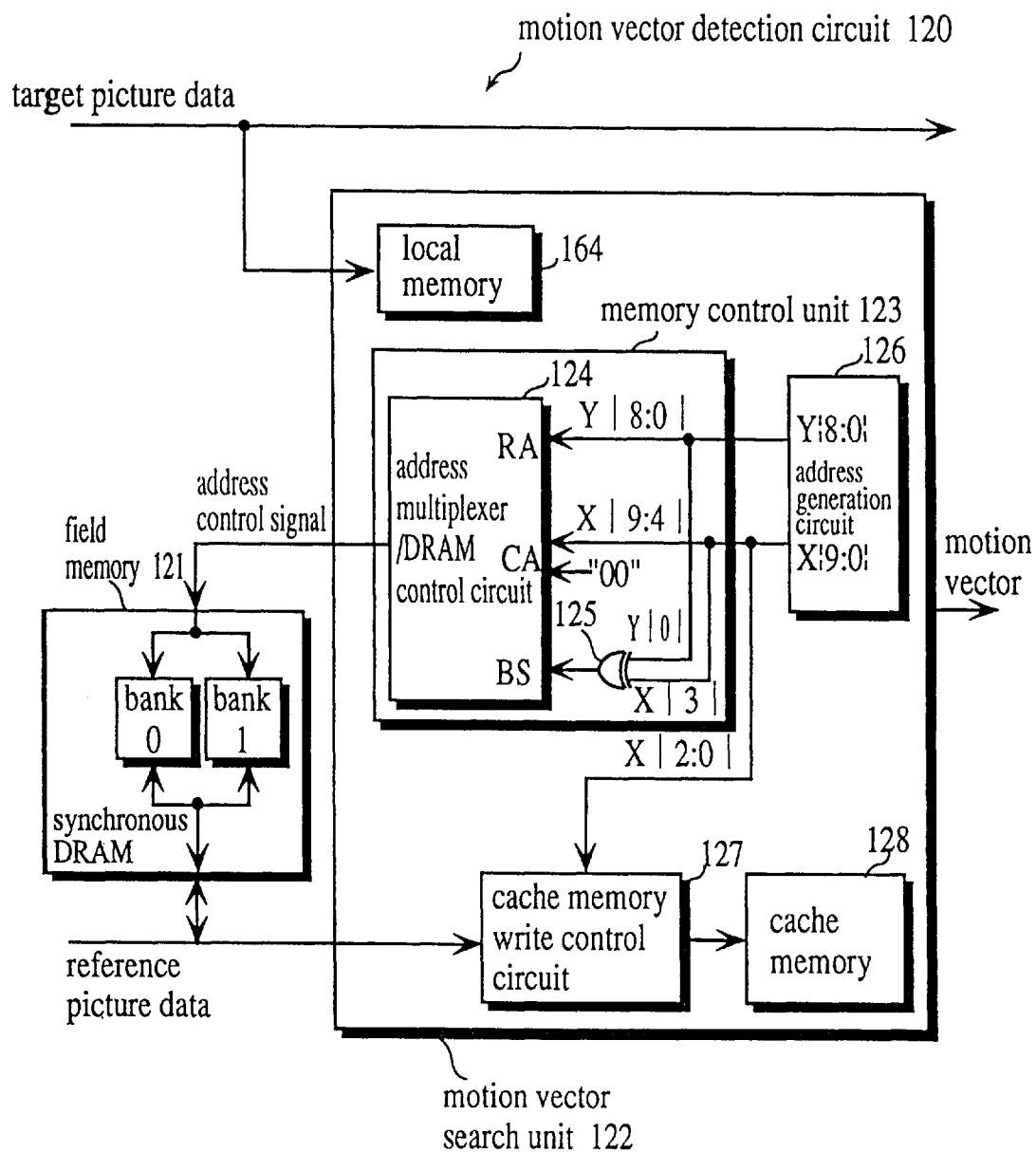
FIG. 14 is a block diagram which shows part of the motion vector detection circuit 120 of the second embodiment.

FIG. 14 is a block diagram which shows part of the motion vector detection circuit 120 of the present embodiment. When a, b, and c are positive integers or zeros, and an X address refers to an address in the scan direction of picture data and a Y address refers to an address in the direction right crossing the scan direction, X[a:b] indicates a binary value of (a−b+1) bits between a bit and b bit inclusive of an X address, and Y[c] indicates a binary value of c bit of a Y address.

In the motion vector detection circuit 120 shown in FIG. 14, the local memory 164 is the same as that of the motion vector detection circuit 160 of the first embodiment shown in FIG. 11. The field memory 121, the motion vector search unit 122, the memory control unit 123, the address. generation circuit 126, and the cache memory 128 correspond to the frame memory 169, the motion vector search unit 162, the memory control unit 165, the address generation unit 166, and the cache memory 167, respectively.

The motion vector detection circuit 120 is further provided with a field memory 121 and a motion vector search unit 122. The motion vector search unit 122 is provided with a memory control unit 123, an address generation circuit 126, a cache memory write control circuit 127, and a cache memory 128. The memory control unit 123 is provided with a bank selection circuit 125 and a address multiplexer/DRAM control circuit 124.

The field memory 121 can be achieved by a commercially available one-chip synchronous DRAM, such as Hitachi, Ltd, HM5241605 series. The HM5241605 series is a 4M-bit synchronous DRAM with a 16-bit (two-pixel) data I/O width and two memory banks (bank 0 and bank 1) which have a memory capacity of 131,072 words, each consisting of 16 bits. In the present embodiment, the amount of data which can be read or written at one access to the field memory 121 is referred to as a word. The synchronous DRAM features to operate in synchronization with a system clock which is inputted from an external device and in accordance with commands which are given by the combination of input pins. These commands will be detailed later with FIGS. 15–17.

The motion vector detection circuit 120 may be designed so that each of the top field and the bottom field is provided with the synchronous DRAM as the field memory 121. Since the synchronous DRAM is a mere picture memory, it is not always necessary to write fields. Consequently, the field memory 121 may be provided as a frame memory when motion vectors are detected between frames only.

The address multiplexer/DRAM control circuit 124 generates DRAM addresses by multiplexing the bank selection signal generated by the bank selection circuit 125 with a 9-bit Y address as a low address and 8-bit X address as a column address. The 8 bits of the column address consist of 6 bits between the ninth bit and the fourth bit and "00" of the least significant two bits of the X address. The address multiplexer/DRAM control circuit 124 further generates a DRAM control signal and outputs it to the field memory 121.

The bank selection circuit 125 EXORs the third bit of an X address with the 0 bit of a Y address, thereby generating a bank selection signal. Then, the address area to be generated in one field of reference picture data consisting of 1024×512 pixels by the address generation circuit 126 is divided into blocks each having 8×1 pixels and distributed to the bank 0 and the bank 1 alternately one by one. Each eight consecutive pixels in the horizontal direction in a reference. picture refers to a one-page mode cycle of each bank, and pixels adjacent to each other in the horizontal direction are distributed to different banks from each other. The length of a page mode cycle is set in a register of synchronous DRAM as a burst length, which corresponds to a reading operation or a writing operation of consecutive picture data to be executed in one command issue. In the page mode cycle, consecutive picture data of the burst length of the same low address are read/written from/to a bank. The length of a page mode cycle can be properly determined by $2^n$ in accordance with the size of the block, n being a positive integer. Generally, the n bit of an X address and the zero bit of an Y address are inputted to the bank selection circuit 125.

The address generation circuit 126 generates a 10-bit X address and a 9-bit Y address as the memory address of the field memory 121.

The cache memory write control circuit 127 receives the zero bit to the second bit of the X address generated by the address generation circuit 126, selects necessary data among reference picture data read from the field memory 121, based on the offset for a readout group and writes the reference picture data to the cache memory 128 by rearranging them.

Figure 15:
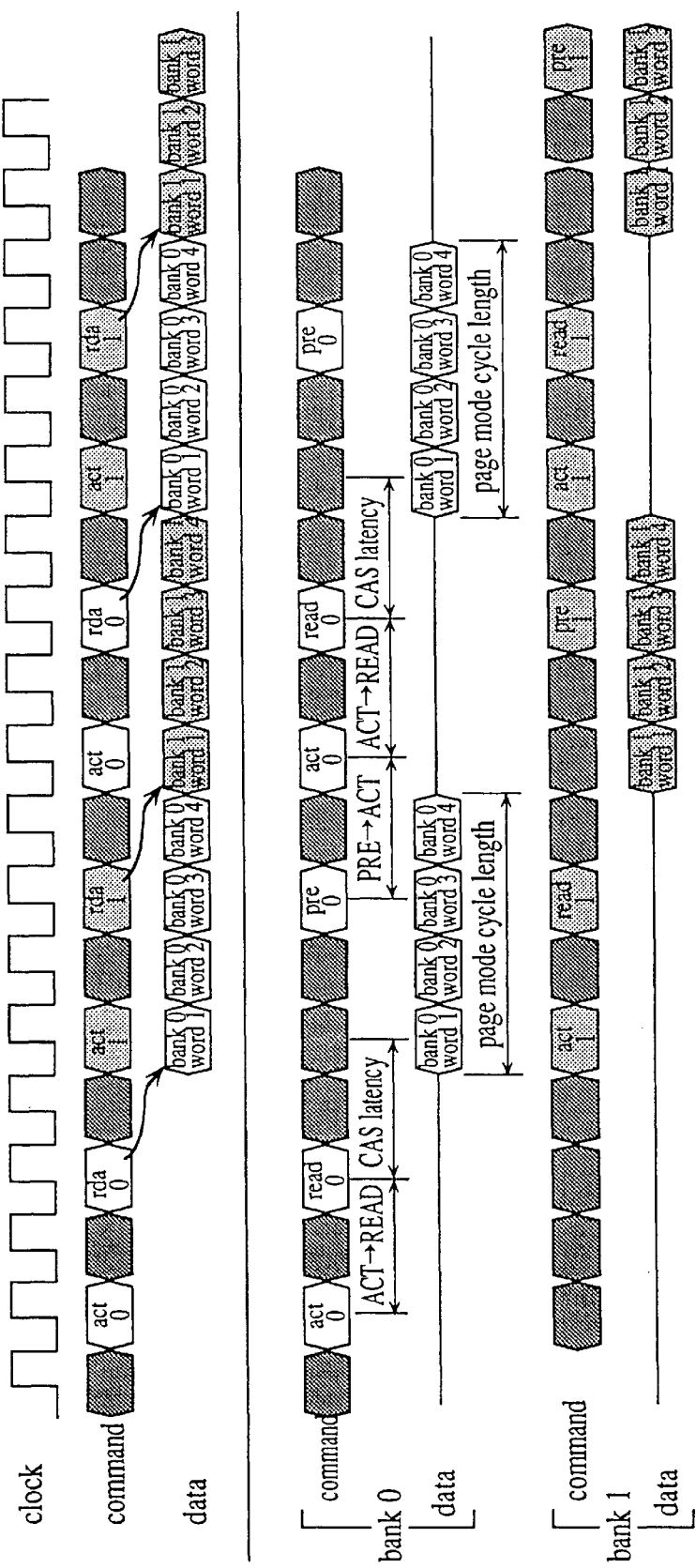
FIG. 15 shows the page distribution to the bank 0 and the bank 1 of the field memory 121, and the corresponding data readout operation.

FIG. 15 shows the page distribution to the bank 0 and the bank 1 of the field memory 121, and the corresponding data readout operation. The top of FIG. 15 shows commands to be inputted to the synchronous DRAM and the picture data to be read accordingly. The middle of FIG. 15 shows the. commands which designate the bank 0 and corresponding outputs. The bottom of FIG. 15 shows the commands which designate the bank 1 and corresponding outputs. The commands "act", "read", "pre", and "rda" shown in FIGS. 15, 17, 21, 23, 25, and 27 designate functions of the synchronous DRAM, and refer to command ACT (row address strobe and bank act), command READ (column address strove and read command), command PRE (precharge select bank), and. command RDA (read with auto precharge), respectively. The command ACT designates a low address, and activates a designated bank. The command READ initiates a reading operation, or a page mode, and picture data are consecutively read from the storage position designated by the column address. The command PRE inactivates a designated bank. In other words, a bank which is in an activated state is inactivated for the next reading operation. The command RDA makes the command PRE be executed to the designated bank, following the command READ.

In order to operate the synchronous DRAM at an operational frequency of around 40 MHz, the delay times between ACT and READ, between PRE and ACT, and between the issue of READ and the output of corresponding data, which is called CAS latency, are all initialized to 2 clocks. Consequently, in the case shown in FIG. 15, the page mode cycle of the synchronous DRAM is set to 4 clocks because it is necessary to return an activated bank to an inactive state and to activate it again by designating the low address, in order to re-boost the RAS. Since this operation requires 4 clocks (PRE→ACT→READ), if the length of a page mode cycle is made longer than 4 clocks, the re-boot of RAS in a bank can be finished while data in the other bank are being read. As shown in the top of FIG. 15, picture data are consecutively read from the bank 0 and the bank 1 without causing a wait time due to the re-boost of RAS.

In this case, since one word of picture data are read in one clock, the length of the page mode cycle needs to be four words at least. Furthermore, each page mode cycle requires at least eight pixels because it is necessary to read picture data per 16 pixels in order to achieve a transmission rate of 160M pixels per second. In the following explanation, each page mode cycle has eight pixels.

Figure 16:
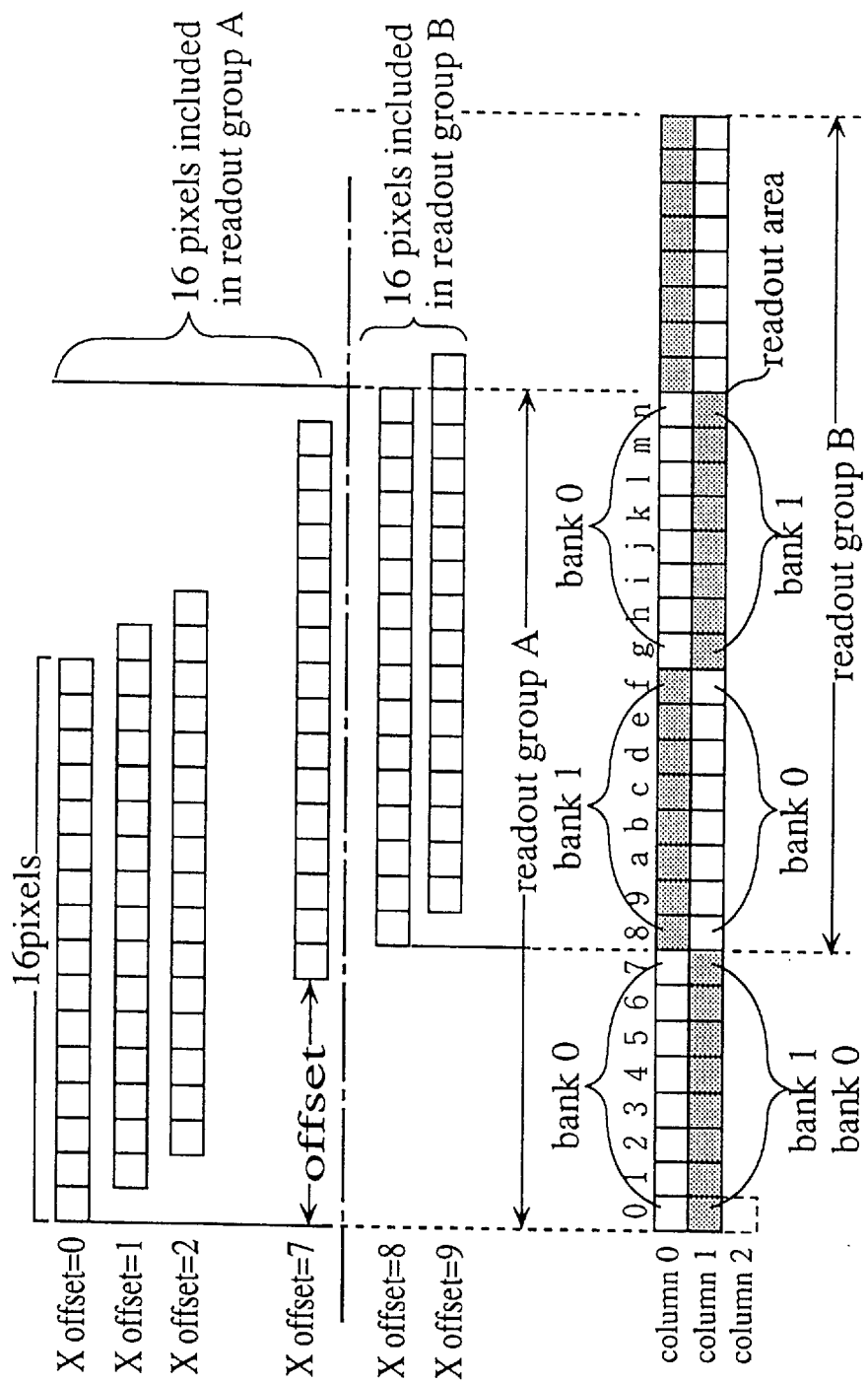
FIG. 16 shows the relationship between 16-pixel picture data which are consecutively read from the field memory 121 in the horizontal direction and a readout group to be read accordingly.

FIG. 16 shows the relationship between 16-pixel picture data which are consecutively read from the field memory 121 in the horizontal direction and a readout group to be read accordingly. The picture data in one field are divided into areas of 1×8 pixels, and areas adjacent to each other in the horizontal direction are distributed to different banks to each other.

As shown in FIG. 16, all of the 16-pixel picture data sequences are included in a readout group consisting of 24 pixels consecutive in the horizontal direction. The readout group is selected by offsetting 0 to 7 pixels to the head pixel of the 16-pixel picture data sequences. In other words, in order to read any desired consecutive 16-pixel picture data in X direction, a readout group (for example, readout group A or readout group B) is read first, and then the desired consecutive 16-pixel picture data can be taken therefrom. When a readout group of three consecutive page mode cycles in the horizontal direction is read, interleaving can be executed in the order of either bank 0→bank 1→bank 0 or bank 1→bank 0→bank 1 when the page mode cycles are switched, thereby completing the reading operation within 12 clocks (4 clock×3 page mode cycles) for any consecutive 16 pixel picture data as shown in FIG. 16.

Figure 17:
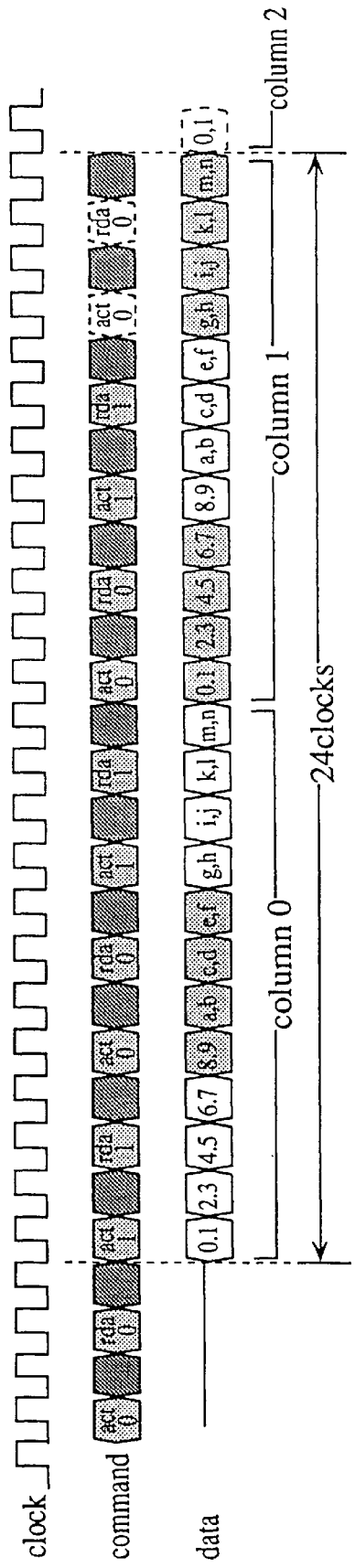
FIG. 17 is a timing chart where areas each consisting of 16×2 pixels are read in the readout group units.
Figure 18A:
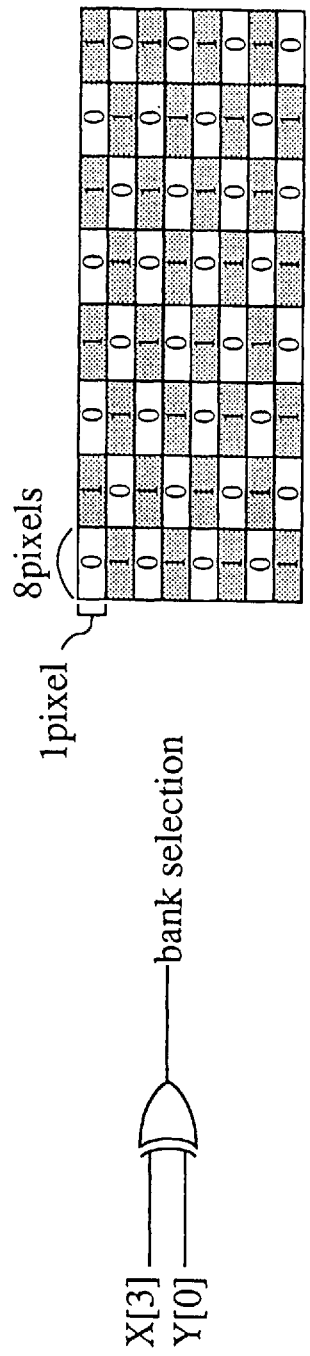
FIGS. 18A and 18B show the construction of a bank selection circuit 125 of the field memory 121 and a page distribution operation of the bank selection circuit 125 when the picture data are written.
Figure 18B:
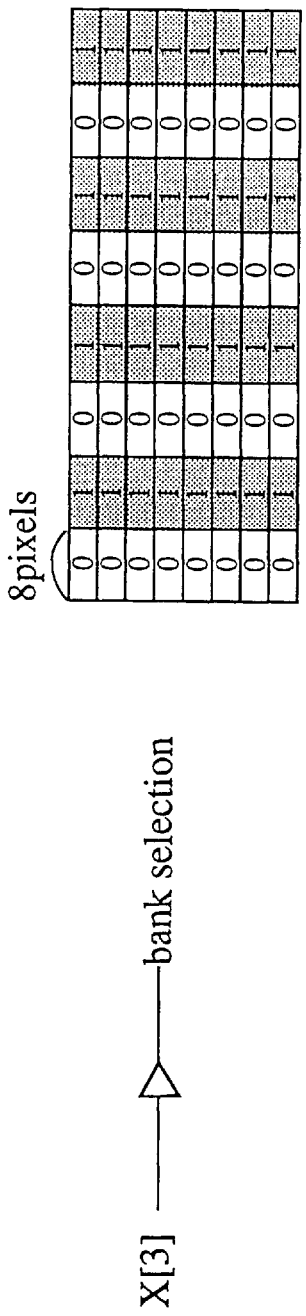

FIG. 17 is a timing chart where areas each consisting of 16×2 pixels are read in the readout group units. In order to read these areas, all the readout groups in the column 0 are read, then all the readout groups in the column 1 are also read. As shown in FIG. 16, when page mode cycles in the horizontal direction are switched or when the reading operation of the readout groups in the column 1 is started after the reading operation of the readout groups in the column 0 is finished, interleaving can be executed from one bank to the other. Consequently, as shown in FIG. 17, the reading operation of the entire readout groups in the columns 0 and 1 can be finished in 24 clocks. Therefore, if picture data of an area having 16×N pixels (N is a positive integer) are read from the field memory 121 by the bank selection circuit 125, the reading operation of all the picture data in the area can be completed in 12N clocks wherever the area is positioned in a frame. FIGS. 18A and 18B show the construction of a bank selection circuit 125 of the field memory 121 and a page distribution operation of the bank selection circuit 125 when the picture data are written. To be more specific, FIG. 18A shows the relationship between the X and Y addresses of picture data to be inputted in the bank selection circuit 125 and a bank selection signal which is outputted accordingly. FIG. 18B shows the relationship between a bank selection signal and the address of picture data when the third bit of the X address is used as the bank selection signal.

In order to store picture data of every page mode cycle (8 pixels) in the X direction to different banks alternately, a bank may be selected by using the third bit of the X address of the picture data as the bank selection signal. In this case, as shown in FIG. 18B, picture data whose Y address are the same are stored in the same bank.

In order to store pixels which are adjacent to each other in the vertical direction to different banks from each other, it is necessary to select a bank depending on the zero bit of the Y address. If the third bit of the X address and the zero bit of the Y address are EXCLUSIVE ORed, the first 8 pixels in the picture data of even-numbered columns in the vertical direction are stored in the bank 0 and the next 8 pixels are stored in the bank 1, and the following pixels are stored in different banks alternately in the same manner. On the other hand, the first 8 pixels in the picture data of odd-numbered columns in the vertical direction are stored in the bank 1 and the next 8 pixels are stored in the bank 0, and the following pixels are stored in different banks alternately in the same manner.

Figure 19A:
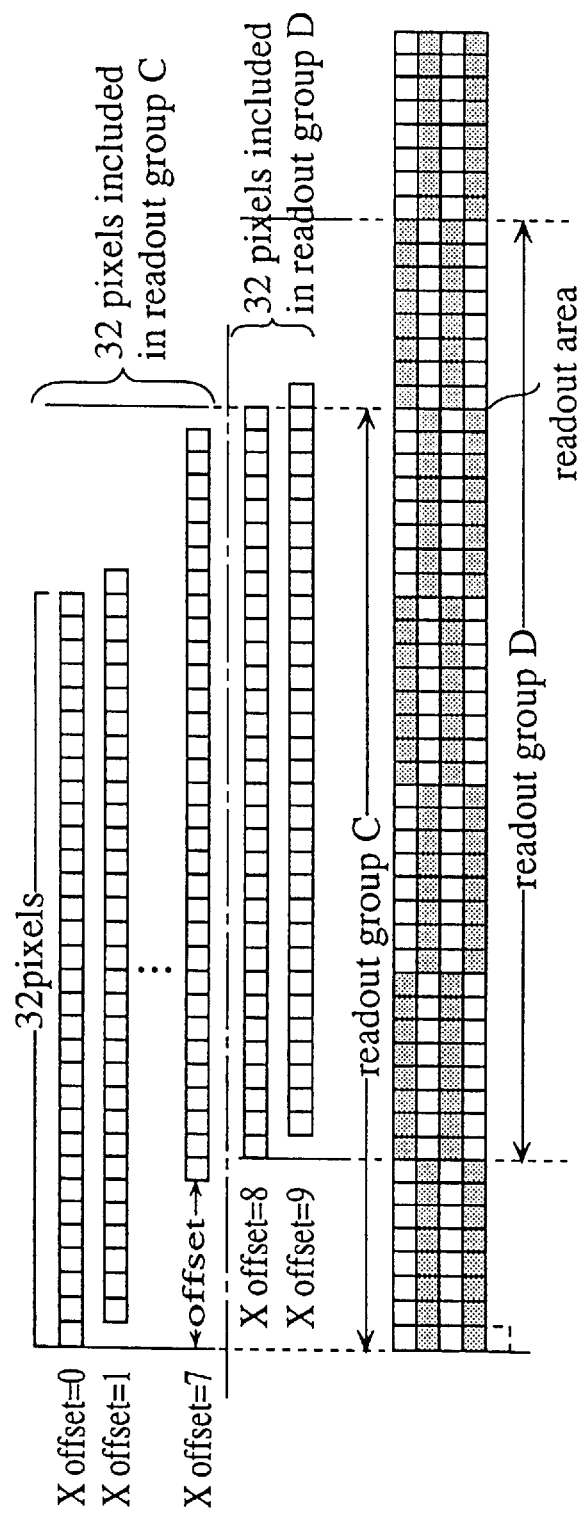
FIG. 19A shows the relationship between 32-pixel picture data sequences to be read consecutive in the horizontal direction and readout groups to be read accordingly.
Figure 19B:
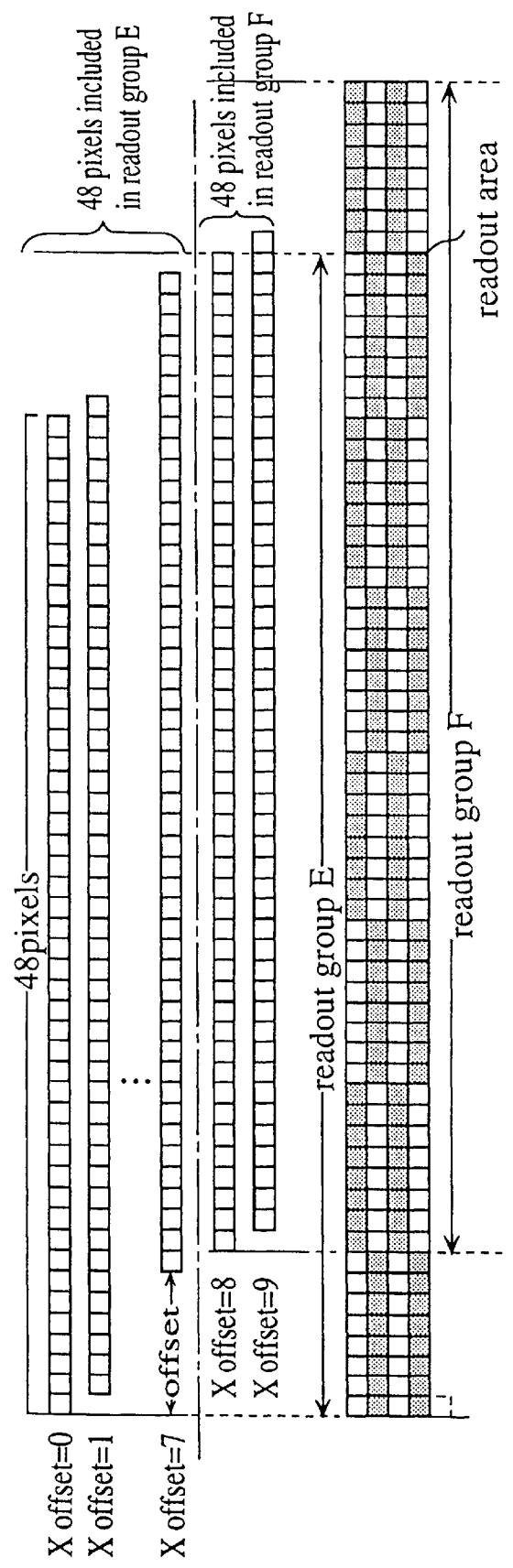
FIG. 19B shows the relationship between 48-pixel picture data and readout groups to be read accordingly.

FIGS. 19A and 19B show the relationship between 32-pixel picture data which are consecutively read from the field memory 121 in the horizontal direction and the readout group to be read accordingly. The picture data in each field in the field memory 121 are divided into areas of 1×8 pixels, and areas adjacent to each other in the horizontal direction are distributed to different banks to each other. As shown in FIG. 19A, all of the 32-pixel picture data sequences are included in a readout group consisting of 32 pixels consecutive in the horizontal direction. The readout group is selected by offsetting 0 to 7 pixels to the head pixel of the 32-pixel picture data sequences. In other words, in order to read any desired consecutive 32-pixel picture data in X direction, a readout group in five page mode cycles=40 pixels (for example, readout group C or readout group D) is read first, and then the desired consecutive 32-pixel picture data can be taken therefrom.

As a result, when page mode cycles are shifted, interleaving are executed between the bank 0 and the bank 1 both in the horizontal direction and the vertical direction, so that the reading operation can always be completed in 4 clocks×5 page mode cycles=20 clocks. Consequently, the reading of picture data in a 32×N pixel area can always be completed in 20N clocks.

FIG. 19B shows the relationship between 48-pixel picture data in a field where areas each consisting of 1×8 pixels are distributed to different banks alternately and readout groups to be read accordingly. As shown in FIG. 19B, all of the 48-pixel picture data sequences are included in a readout group consisting of 56 pixels consecutive in the horizontal direction. The readout group is selected by offsetting 0 to 7 pixels to the head pixel of the 48-pixel picture data sequences. In other words, in order to read any desired consecutive 48-pixel picture data in X direction, a readout group having 7 page mode cycles (for example, readout group E or readout group F) is read first, and then the desired consecutive 48-pixel picture data can be taken therefrom. As a result, when page mode cycles are shifted, interleaving are executed between the bank 0 and the bank 1 both in the horizontal direction and the vertical direction, so that the reading operation can always be completed in 4 clocks×7 page mode cycles=28 clocks. Consequently, the reading operation of picture data in 48×N pixel area can be completed in 28N clocks.

As explained hereinbefore, when the present invention is applied to the reading of areas which have pixels of 16, 32, or 48 in X direction, which are commonly used in the picture data-processing such as picture data-compressing, it is necessary to have odd-numbered page mode cycles per scan line. In this case, if a bank is selected by only the third bit of an X address as shown in FIG. 16B, the final area in a scan line and the first area in the next scan line are distributed to the same bank, and as a result, the RAS cycle must be re-booted for shifting the page mode cycles, which leads to an decrease in the readout efficiency.

When a search unit consists of 16×16 pixels and a search area consists of ±16×±16 pixels, the entire number of pixels in the search area is 48×48 pixels. When motion picture data to be inputted have 720×480 pixels, 30 frames per second, and pixel rate of 13.5 MHz as defined in NTSC, the process time to be given for each search unit to detect a motion vector in real time is about $19\mu$ seconds (16×16×74 nsec). The transmission rate at which all reference picture data corresponding to the search unit should be inputted in the motion vector detection circuit within the time period is about 120M pixels per second or higher. This is the transmission rate necessary between the reference picture data memory and the unit of searching in telescopic search.

The following comparison between the reading of picture data blocks from the field memory 121 where pages are distributed as explained above and the reading of picture data blocks from the 2-bank synchronous DRAM picture data memory shown in FIGS. 8A–8B and 9A–9B where pages are distributed in the conventional manner, will be explained with reference to FIGS. 17–27. The readout efficiency decreases when the same bank is accessed consecutively exceeding the page mode cycle border, as explained earlier. Therefore, in the following explanation, the number of clocks which are needed after the reading of 16-pixel area in the column 0 is started before the reading of 16-pixel area in the column 2 is started.

Figure 20B:
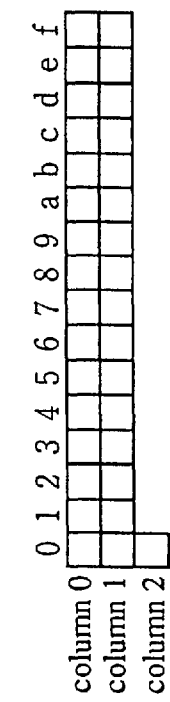
FIGS. 20A–20B show the positional relationship between 16-pixel areas to be read from the conventional synchronous DRAM and the page mode cycle border.
Figure 20A:
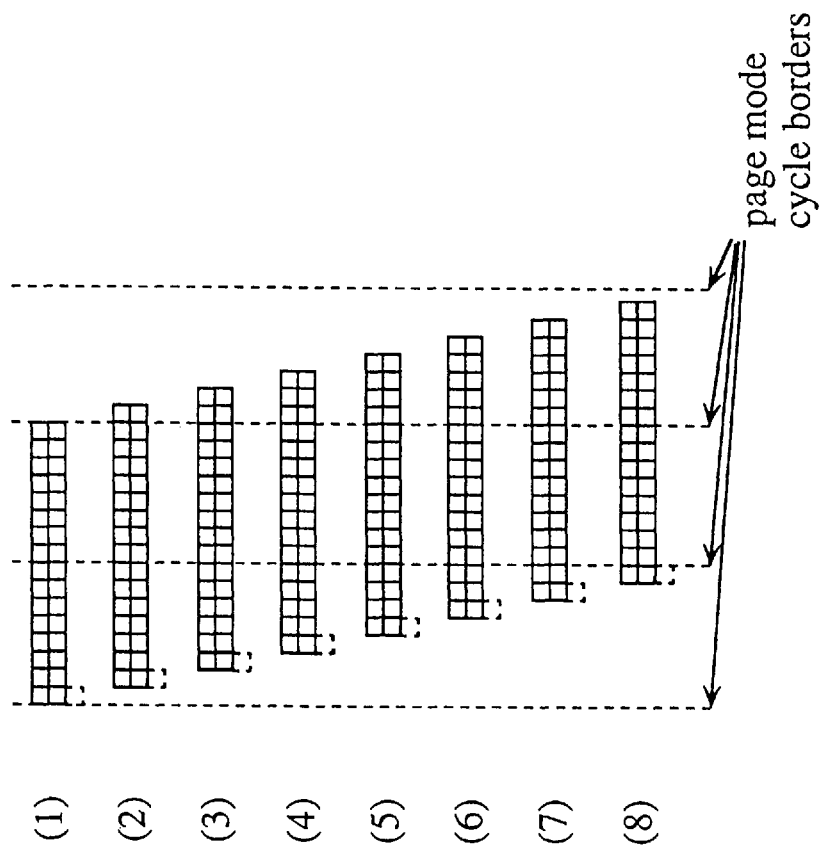
Figure 21:
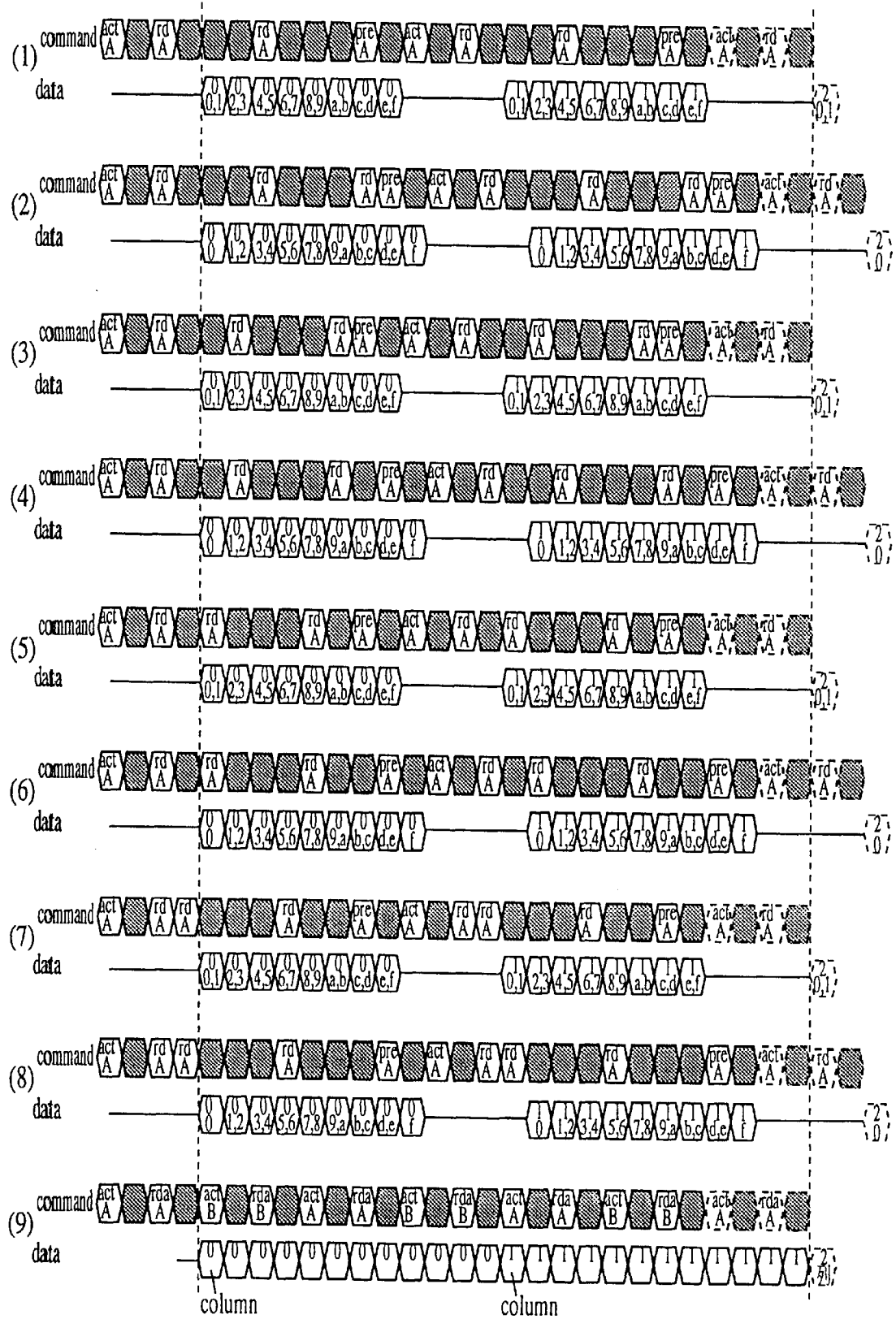
FIG. 21 shows a timing chart for picture data of an area which involves no bank shifting in X direction to be read from the conventional synchronous DRAM.

FIGS. 20A–20B show areas each consisting of 16 pixels in the X direction to be read from the conventional synchronous DRAM, and the positional relationship between these areas and the page mode cycle border, respectively. FIG. 21 shows a timing chart for picture data of an area which involves no bank shifting in the X direction to be read from the conventional synchronous DRAM. To be more specific, FIG. 21 shows how picture data of an area which has 16 pixels in the X direction which is arranged as the squares 80 and 81 is read from the synchronous DRAM with the page distribution shown in FIG. 8A.

FIG. 21 also shows command series to read areas which have the positional correlation shown in (1)–(8) of FIG. 21, and picture data to be read by the command series. In the command series, A and B indicate bank 0 and bank 1, respectively. In each picture data shown in the drawing, the top number represents the column number of picture data to be read and the bottom number represents a relative X address in the area. The (1)–(8) of FIG. 21 show the cases where the offsets of X addresses are 0 to 7 when three page mode cycles consecutive in the X direction are regarded as the readout groups. The broken lines indicate the page mode cycle boarders. The (9) of FIG. 21 shows the case where the areas shown in FIG. 20A are read by using three page mode cycles consecutive in the X direction as the readout group-as shown in FIG. 17. In the command series, "act", "rd", "pre", and "rda" represent command ACT, command READ, command PRE, and command RDA, respectively.

Figure 8A:
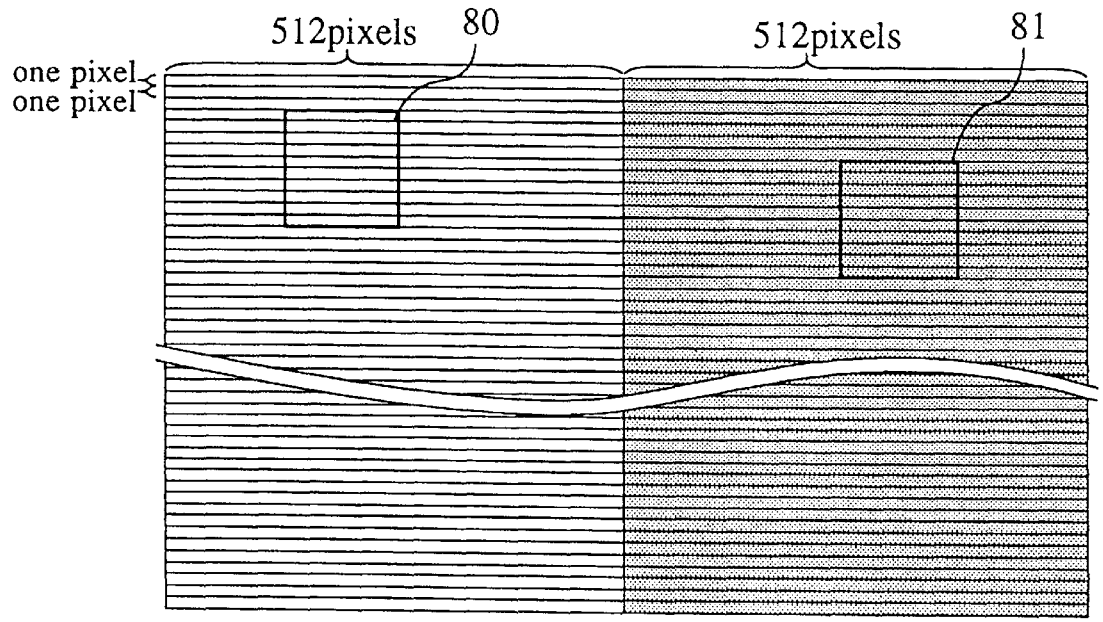
FIG. 8A shows picture data in one page which are distributed to the bank 0 and the bank 1 alternately by every 512 pixels in the scan direction.
Figure 8B:
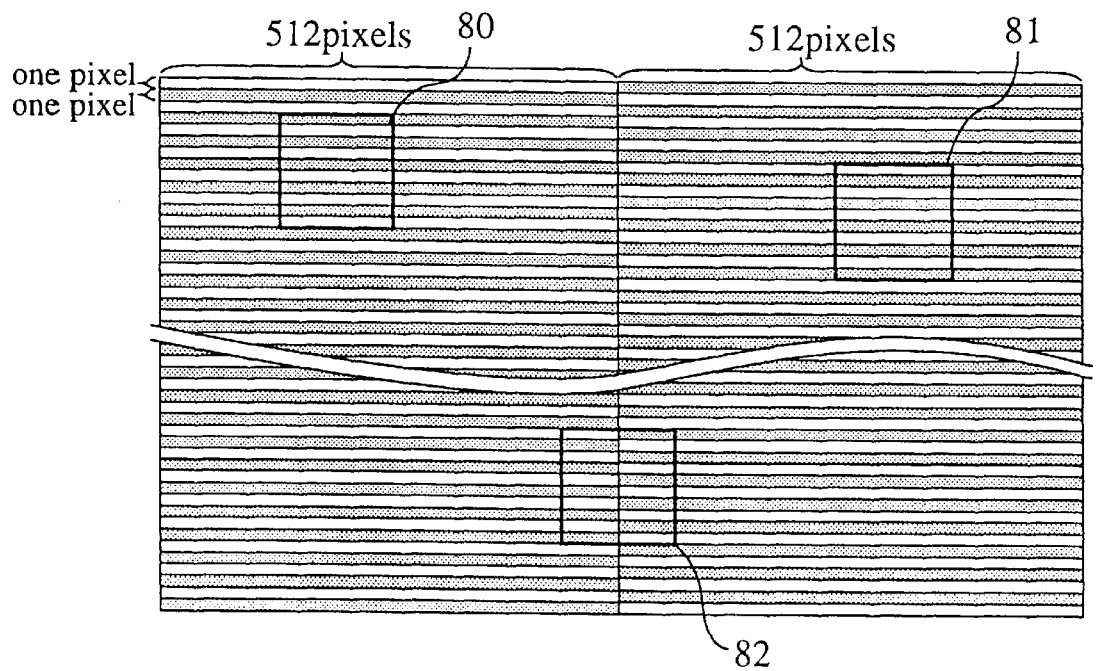
FIG. 8B shows picture data in one field which are distributed to bank 0 and the bank 1 alternately every scan line.
Figure 9A:
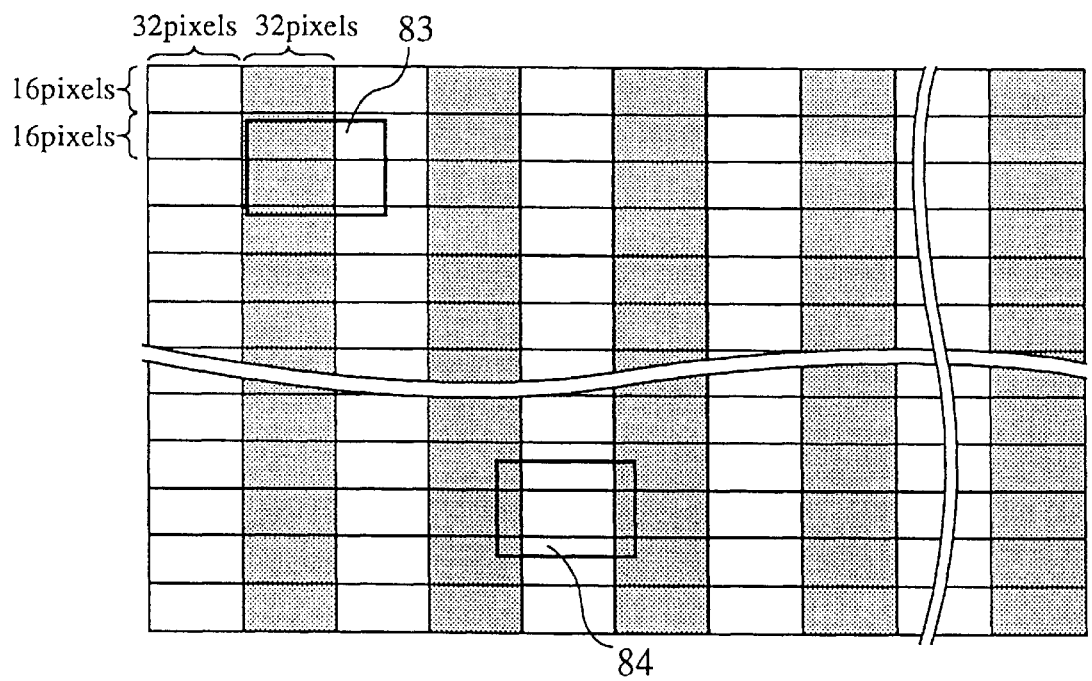
FIG. 9A shows each field which is divided into a plurality of block areas each consisting of 32×16 pixels, and distributed to the bank 0 and the bank 1 alternately.
Figure 9B:
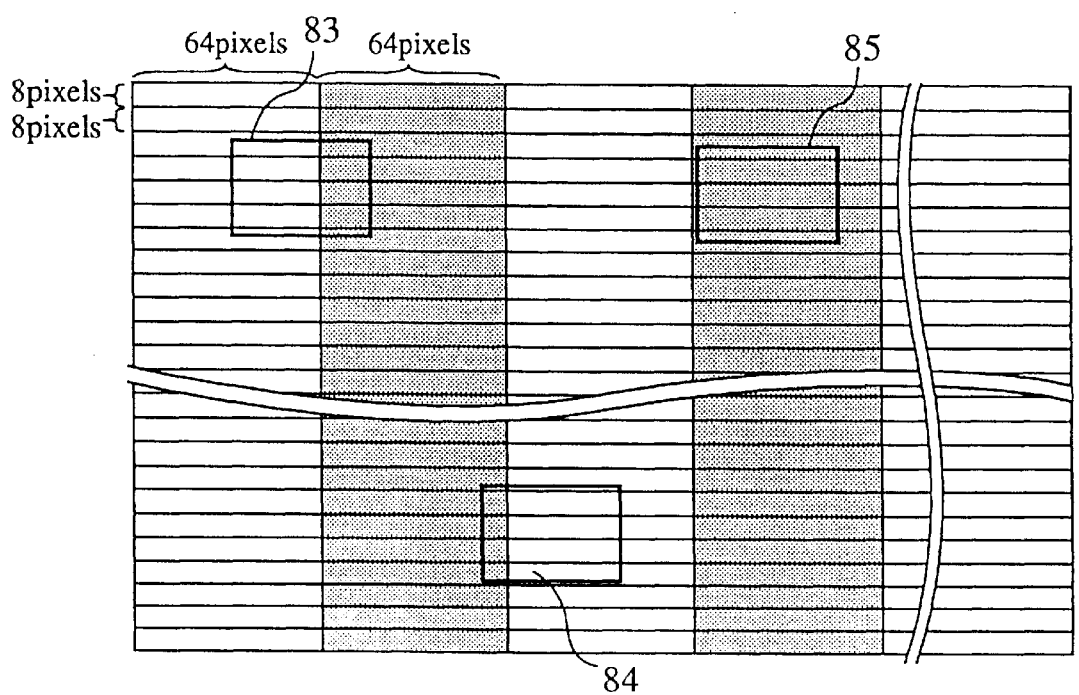
FIG. 9B shows each field which is divided into a plurality of block areas each consisting of 64×8 pixels, and distributed to the bank 0 and the bank 1.
Figure 10A:
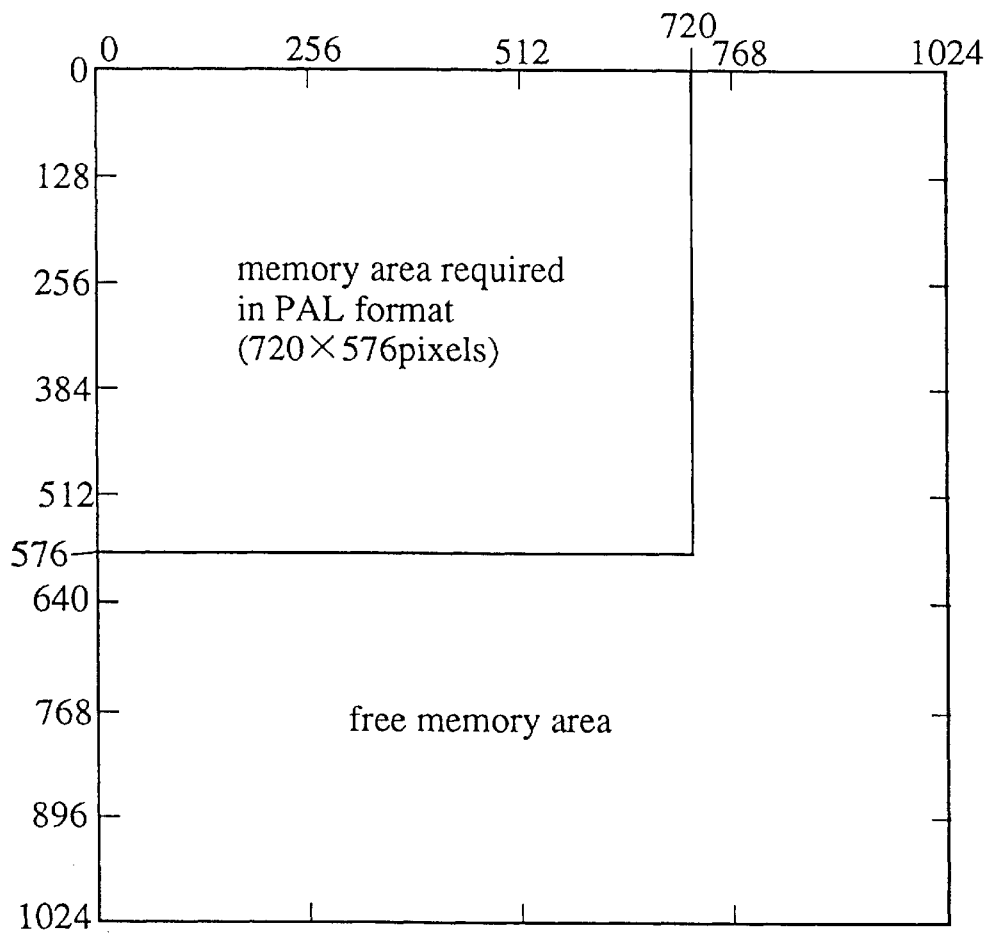
FIG. 10A shows the predetermined storage area of a frame memory of 1024×1024 pixels is used to store PAL format picture data of 720×576 pixels.
Figure 10B:
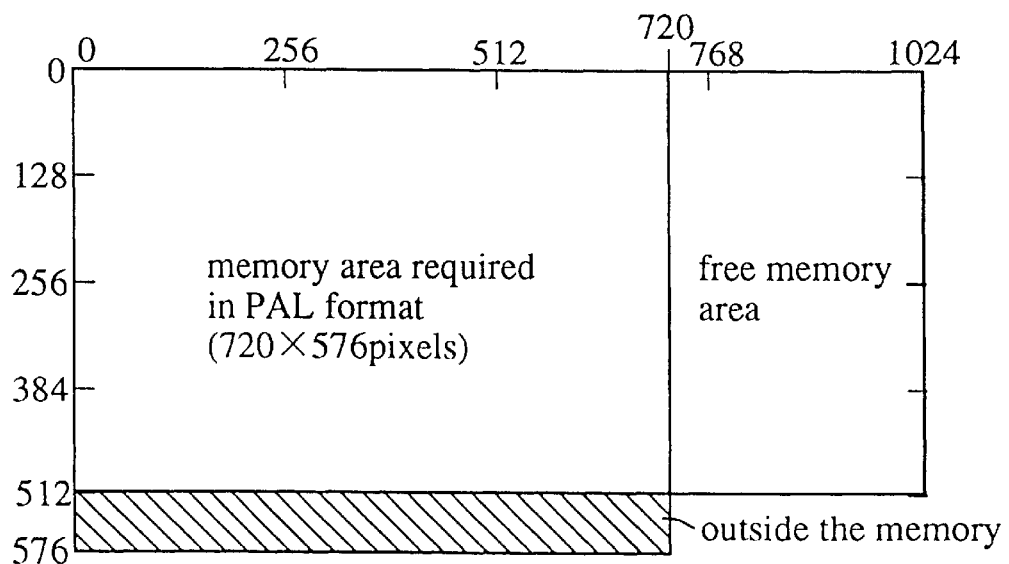
FIG. 10B shows part of picture data which cannot be stored when the storage area of the frame memory is made 1024×512 pixels.

As shown in (1)–(8) of FIG. 21 in the page division shown in FIG. 8A, picture data in the columns 0 and 1 in the area are consecutively read by the single command ACT. However, after the completion of the reading in the column 0 before the reading in the column 1 is started by the command READ, a 4-clock overhead is caused in PRE→ACT→READ. Especially when the offset of the X address of the head pixel in the area is odd numbered, it is necessary to read one more word per column than in the case where the offset is even numbered. Consequently, it takes 26 clocks after the first picture data in the column 0 is outputted before the first picture data in the column 2 is outputted. This is 2 clock longer than in the case where the above-mentioned area is read from the field memory 121 of the present embodiment as shown in (9) of FIG. 21.

FIGS. 22A–22B and 24A–24B show the positional relationship between areas each having 16 pixels in the X direction which are read from the conventional synchronous DRAM, and page mode cycle borders including one bank border. FIGS. 23 and 25 show timing charts in the cases where picture data of the areas are read at one bank switch in the X direction from the conventional synchronous DRAM. To be more specific, FIGS. 23 and 25 show the case where picture data of areas each having 16 pixels in the X direction which are arranged like the squares 83 and 84 are read from the synchronous DRAM which has the page distribution shown in FIG. 9A or FIG. 9B.

Figure 22B:
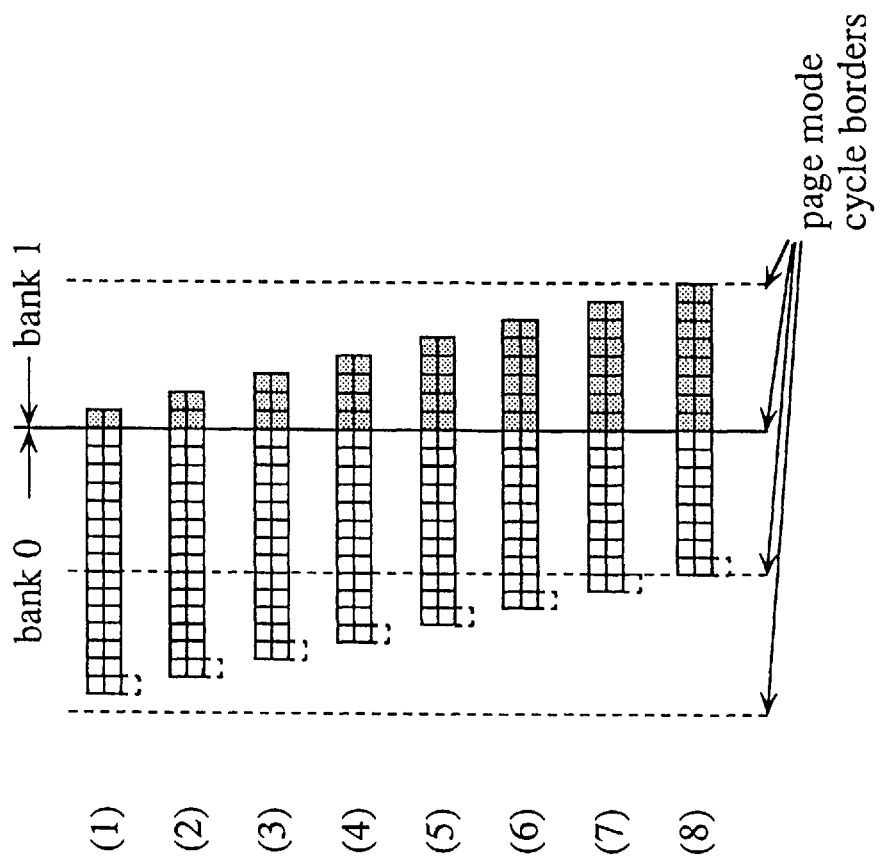
FIGS. 22A–22B show the positional relationship between areas each having 16 pixels in X direction which are read from the conventional synchronous DRAM, and page mode cycle borders including one bank border.
Figure 22A:
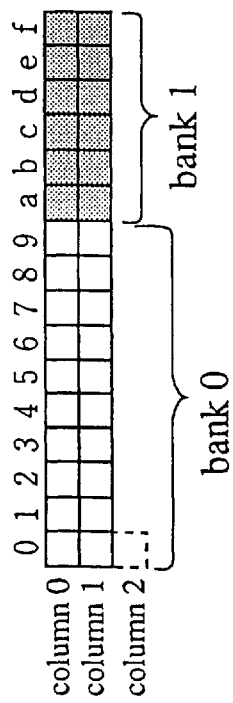
Figure 23:
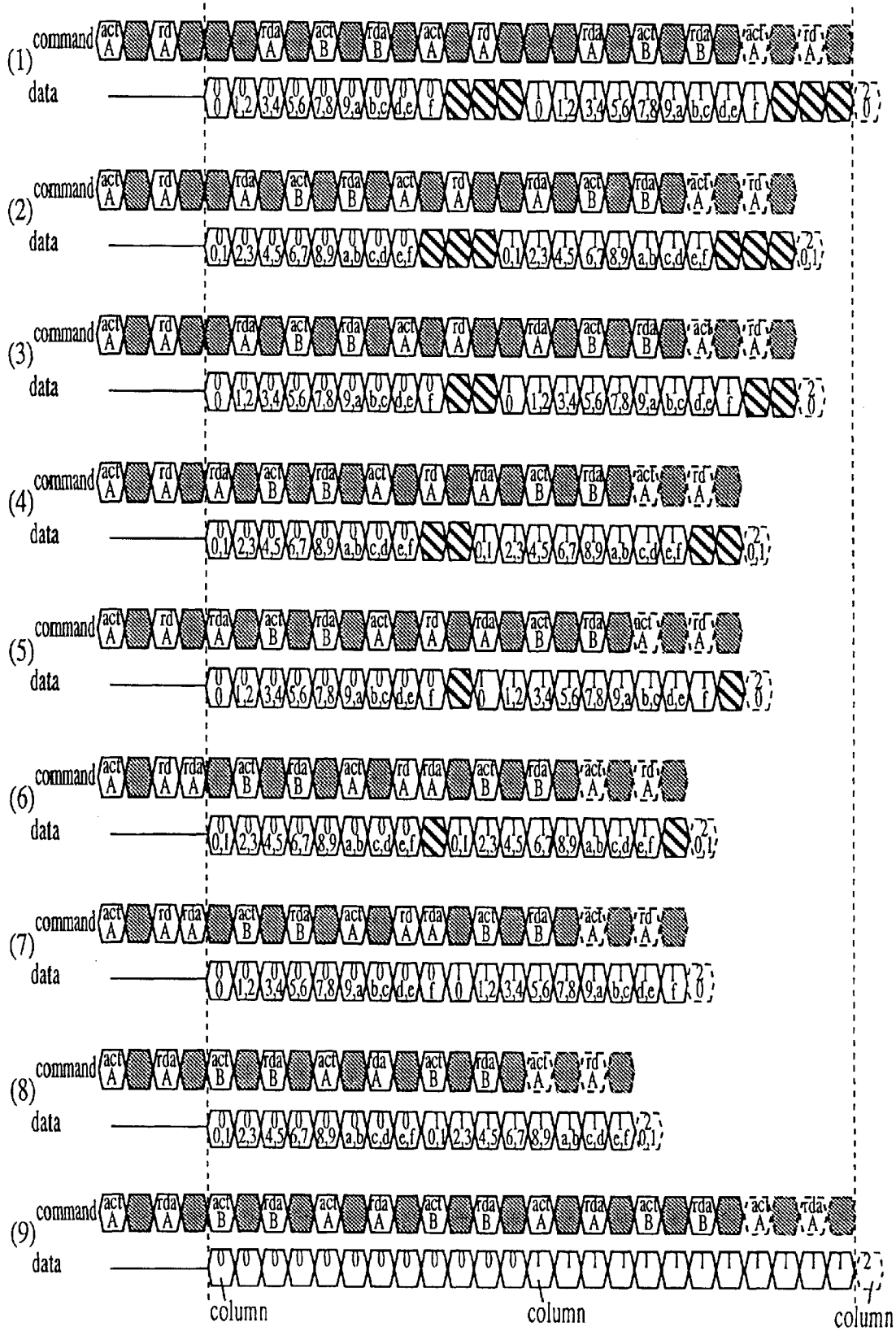
FIG. 23 shows timing charts in the cases where picture data of the areas are read at one bank switch in the X direction from the conventional synchronous DRAM.

The (1)–(8) of FIG. 23, which correspond to the (1)–(8) of FIG. 22B, show the timings for reading picture data of 1 to 8 pixels from the bank 1 after the picture data of 8 to 15 pixels are read from the bank 0 when the 16-pixel blocks are read. In contrast, the (1)–(7) of FIG. 25 show the timings for reading picture data of 9 to 15 pixels from the bank 1 after the picture data of 1 to 7 pixels are read from the bank 0 when the 16-pixel blocks are read. The (9) in FIGS. 23 and 25 show the case where the areas shown in FIGS. 22A and 24A are read by using three page mode cycles consecutive in the X direction as the readout group as shown in FIG. 17.

In FIGS. 22A–22B and 24A–24B, the picture data in dotted blocks may be abandoned or kept unread after being read once. However, even if these picture data are kept unread, there is a 2-clock delay time during PRE→ACT→READ for the other bank, so that the time to read the picture data becomes an overhead time.

Figures 24A, 24B:
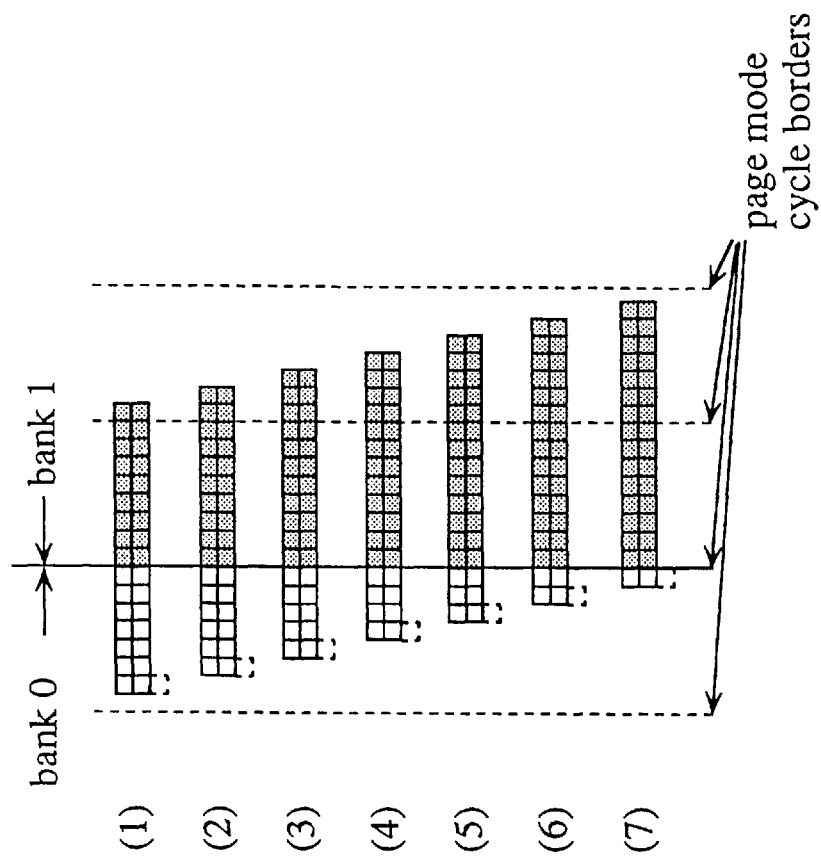
FIGS. 24A–24B show the positional relationship between areas each having 16 pixels in X direction which are read from the conventional synchronous DRAM, and page mode cycle borders including one bank border.
Figure 25:
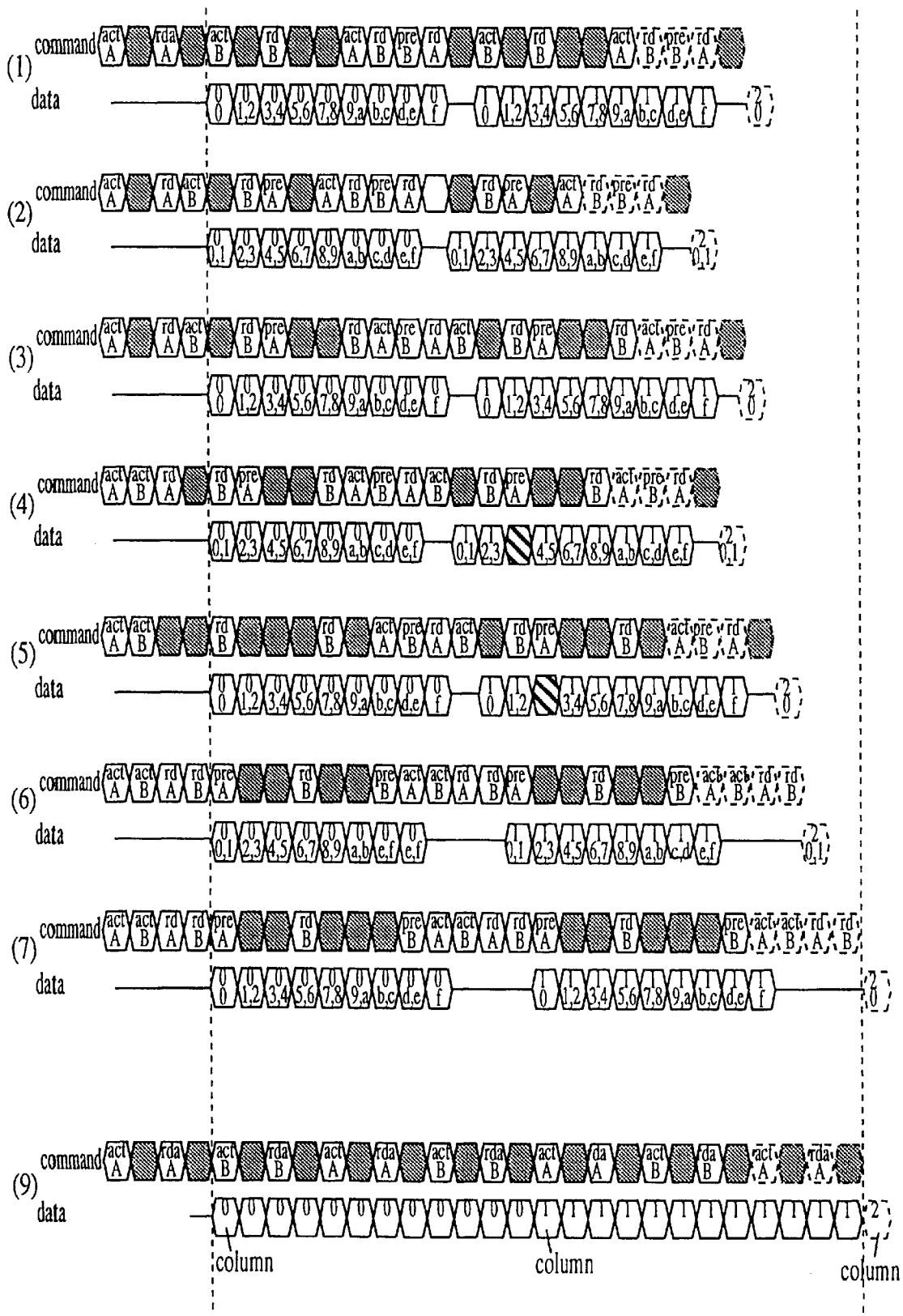
FIG. 25 shows timing charts in the cases where picture data of the areas are read at one bank switch in the X direction from the conventional synchronous DRAM.

As shown in (1) of FIG. 22B and (7) of FIG. 24B, the longest reading time is needed when only one pixel among the 16 pixels in the X direction is distributed to a bank and the rest 15 pixels are distributed to the other bank. In this case, it takes 24 clocks after the first picture data in the column 0 is outputted before the first picture data in the column 2 is outputted. This is the same time period as the readout time shown in (9).

Figure 26A:
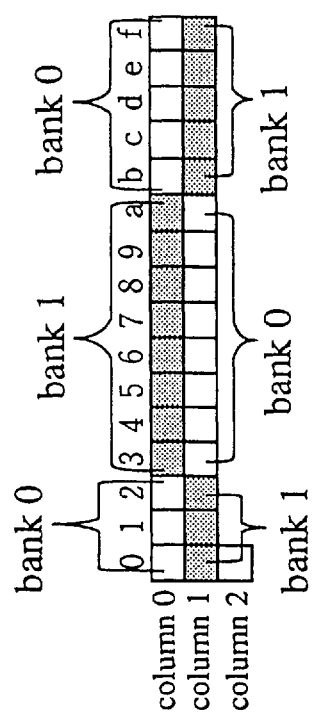
FIGS. 26A–26B show the positional relationship between areas each consisting of 16 pixels to be read from the field memory 121 of the first embodiment and the page mode cycle border.
Figure 26B:
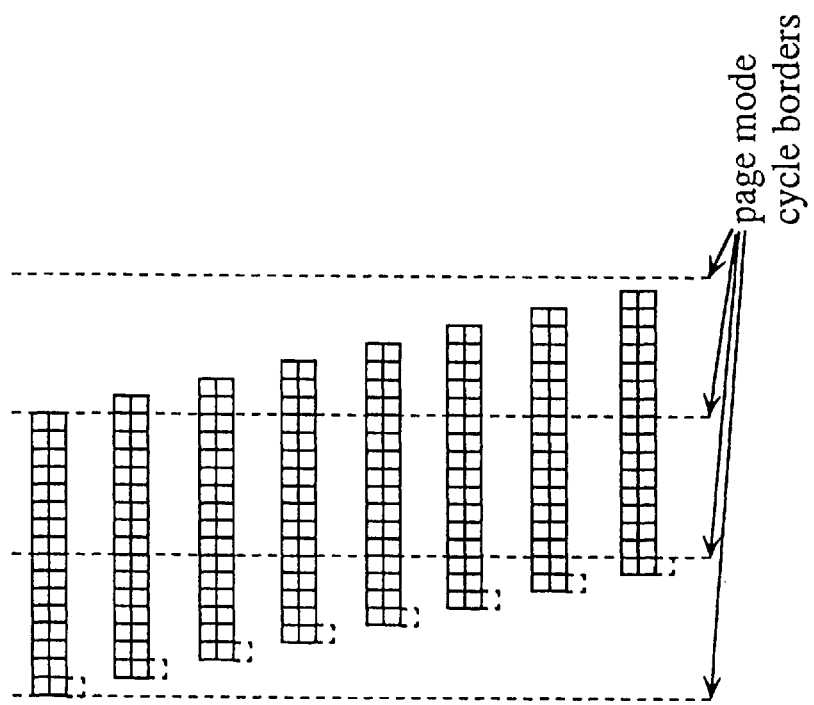
Figure 27:
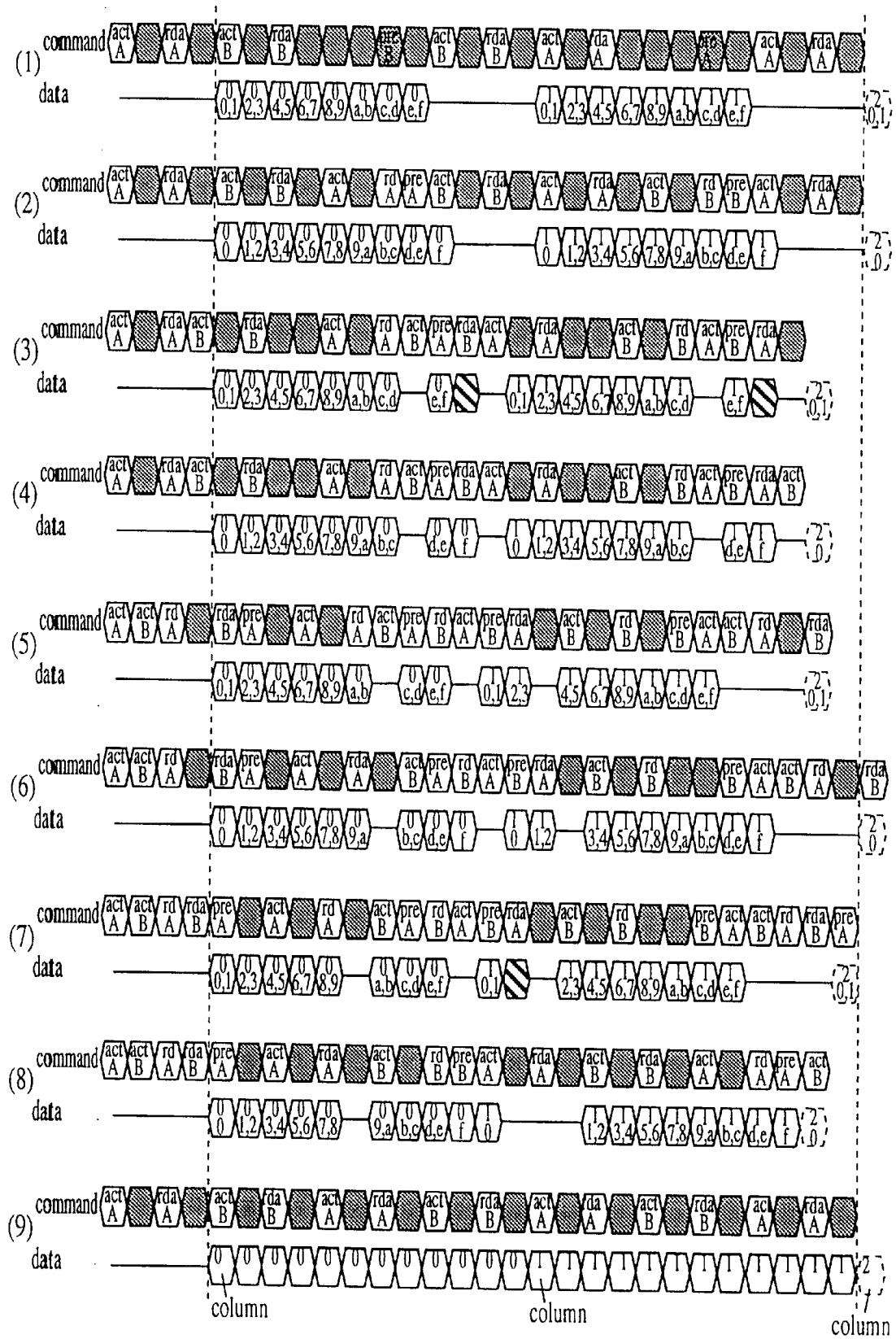
FIG. 27 is a timing chart for reading areas each having 16 pixels in the X direction from the field memory 121.

FIGS. 26A–26B show the positional relationship between areas each consisting of 16 pixels to be read from the field memory 121 of the present embodiment and the page mode cycle border. FIG. 27 is a timing chart for reading areas each having 16 pixels in the X direction from the field memory 121 in the same manner as conventional way. The (1)–(8) in FIG. 27 show the cases where the offsets of X address to the page mode cycle border are set at 0 to 7. The (9) shows the case where the areas shown in FIG. 26A are read by using three page mode cycles consecutive in the X direction as the readout group as shown in FIG. 17.

As shown in (1)–(8) of FIG. 27, it is within 24 clocks after the first picture data in the column 0 is read before the first picture data in the column 2 is read. This is the same readout efficiency as the readout time shown in (9). However, all the timings for issuing commands shown in FIG. 27 are different except for (3) and (4). In such a case, a complex DRAM control circuit is necessary to adjust the readout control operation to the offset of the X address of areas to the page mode cycle boarder.

In the same manner, in the (1)–(8) of each of FIGS. 21, 23, and 25, all the timings for issuing commands shown in FIG. 27 are different except that (2) and (3), (4) and (5), and (6) and (7) have the same timing, respectively. However, conventional page distribution needs a more complex DRAM control circuit in accordance with the offset of the X address to the page mode cycle border and the positional relationship between the bank boarder and readout area. In contrast, in the present embodiment, as shown in FIGS. 16 and 17, any desired areas can be read in a single memory cycle, although the order of banks 0 and 1 is different, and as a result, the memory control unit 123 can be greatly simplified.

As explained hereinbefore, in the present embodiment, picture data can be written in banks of the field memory 121 by using the above-explained page distribution with simple construction and simple control. In addition, the field memory 121 can read picture data efficiently and stably with a simple control. It might be possible to achieve the same level of readout efficiency of the present invention by using a synchronous DRAM with high-speed page mode cycle switch or with special functions. However, to limit the types of synchronous DRAMs is inconvenient in view of productivity.

In addition, from the feature of the present embodiment that a single memory cycle is used continuously, picture data in the same column in the X direction are always inputted continuously. For this reason, in the cache memory write control circuit 127, it is easily determined at which word effective data are started, based on the zero to second bits of the X address of the read picture data. Consequently, picture data of any necessary number of pixels can be consecutively written in the cache memory. Thus, the control of reading picture data to a cache memory can be simplified in the present embodiment.

EMBODIMENT 3

Figures 28A, 28B, 28C:
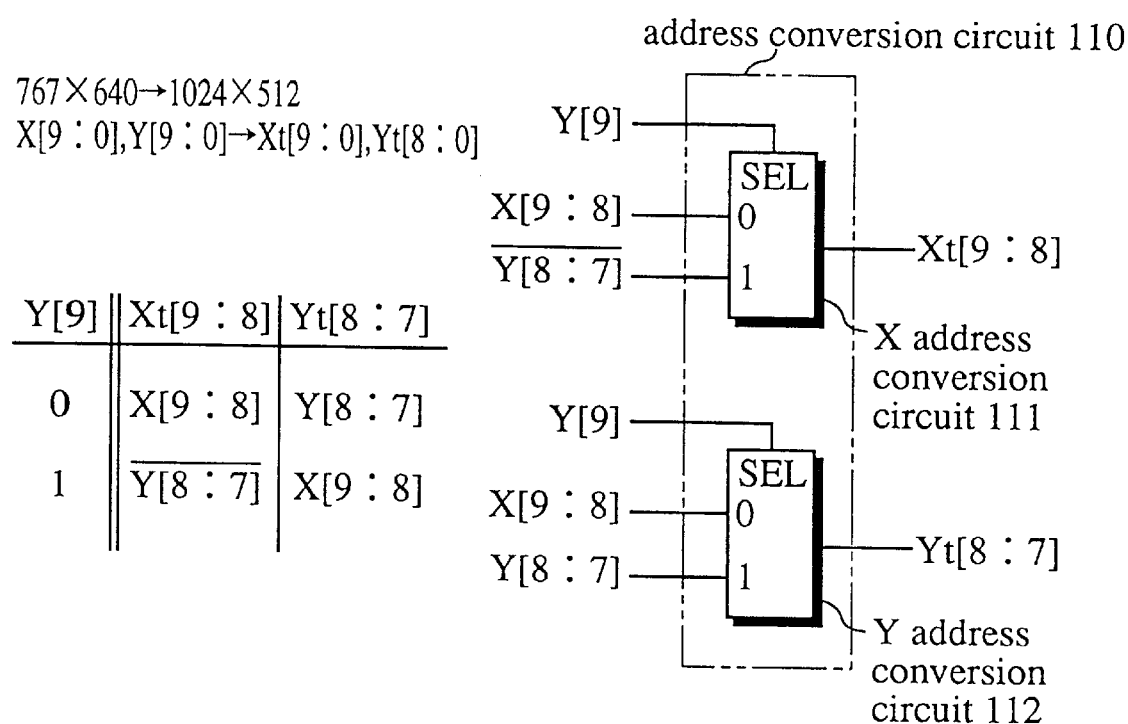
FIGS. 28A–28C show the construction and input/output of the address conversion circuit 110 of the third embodiment, which is realized by a multiplexer.

FIGS. 28A shows the construction and input/output of the address conversion circuit 110 of the present embodiment, which is realized by a multiplexer. As shown in FIG. 28A, the address conversion circuit 110 includes an X address conversion circuit 111 and a Y address conversion circuit 112. The X address conversion circuit 111 and the Y address conversion circuit 112 are realized by a multiplexer which uses Y[9] as a selection signal.

The address conversion circuit 110 converts an address for an area consisting of 768×640 pixels into an address for an area consisting of 1024×512 pixels. In other words, the address conversion circuit 110 generates a 10-bit conversion X address (hereinafter Xt[9:0]) and a 9-bit conversion Y address (hereinafter Yt[8:0]) from X[9:0] and Y[9:0]. Since the actual conversion process is executed in 256×128 pixel blocks as a unit, the addresses are converted from (X[9:8], Y[9:7]) to (Xt[9:8], Yt[8:7]).

The X address conversion circuit 111 receives X[9:8] and a reverse output of Y[8:7]. The X address conversion circuit 111 selects X[9:8] as Xt[9:8] when Y[9], which is a selection signal, is 0, and selects the reverse output of Y[8:7] as Xt[9:8] when Y[9] is 1.

The Y address conversion circuit 112 receives Y[8:7] and X[9:8]. The Y address conversion circuit 112 selects the Y[8:7] as Yt[8:7] when Y[9] is 0, and further selects the X[9:8] as Yt[8:7] when the Y[9] is 1.

Figure 29A:
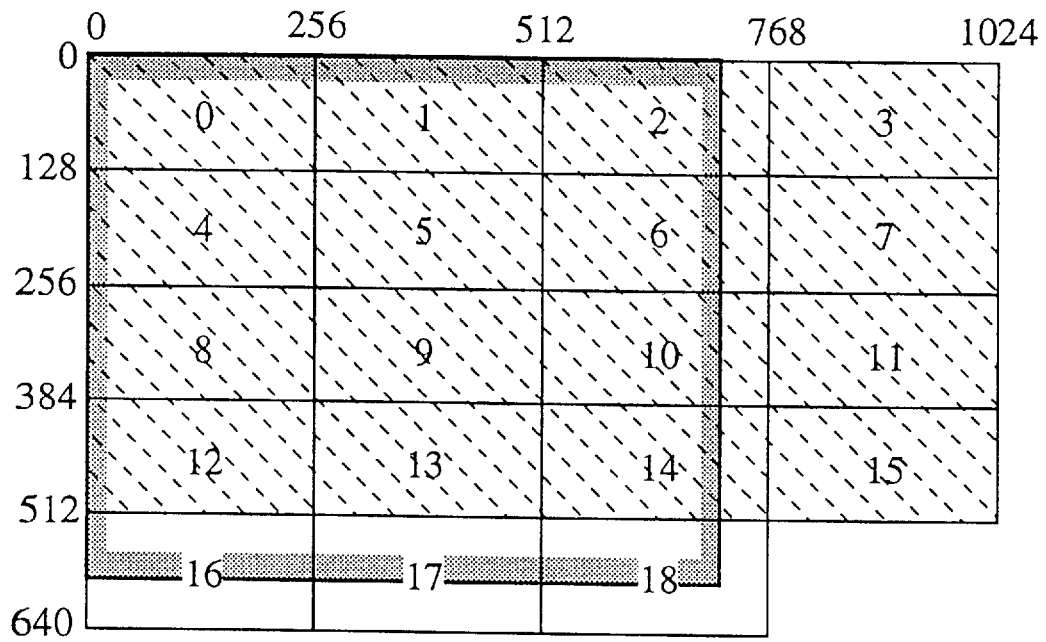
FIGS. 29A–29B show the relationship between the size of picture data to be written in memory and the actual storage area in the picture data memory.
Figure 29B:
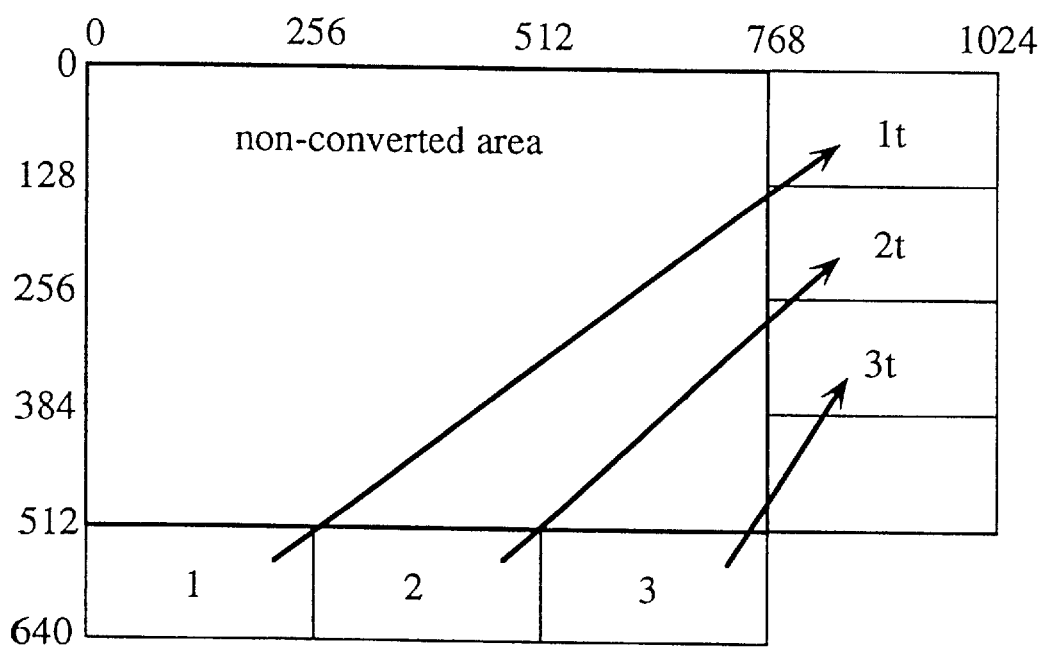

FIGS. 29A–29B show the relationship between the size of picture data to be written in memory and the actual storage area in the picture data memory. To be more specific, FIG. 29A shows PAL format picture data and the actual storage area in 4M-bit memory whose resolution is 1024×512 pixels each consisting of 8 bits. The picture area is divided into blocks numbered 0–18 each consisting of 256×128 pixels. The PAL format picture data have a resolution of 720×576 pixels per frame. Consequently, when the coordinates of each pixel of PAL format picture data are written as an address in the memory, the picture data can be stored in the storage area of 768×640. In this case, the blocks numbered 16–18 cause an overflow, whereas the blocks numbered 3, 7, 11, and 15 are not used. When the coordinates of each pixel of PAL format picture data for one screen are inputted as an address in the address conversion circuit 110, the Y address of the picture data is between 512 and 576 inclusive. The Y address of each of the blocks 16–18 which cause an overflow is between 512 and 639 inclusive. Therefore, when the 9th bit of a Y address is 1, only the zero to sixth bits can be 1. Consequently, Y[8:7] to be inputted to the Y address conversion circuit 112 is always "00" in binary, and the reverse input of Y[8:7] to be inputted to the X address conversion circuit 111 is always "11" in binary.

FIG. 29B shows the relationship between blocks before the address conversion and blocks after the address conversion which is executed by the address conversion circuit 110. Since Y[9] of each of the blocks numbered 16–18 which cause an overflow is 1, the X address conversion circuit 111 selects the reverse input of Y[8:7] as Xt[9:8], and the value of the reverse input is "11" in binary. The X address "1 1000 0000" in binary corresponds to 768 in decimal number, and the range of the address expressed by X[7:0] is between 0 and 511 inclusive, so that the X address after the address conversion. is in the range of between 768 and 1024.

The Y address conversion circuit 112 selects X[9:8] of the blocks 16–18 as Yt[8:7]. Since X[9:8] of the block 16 is "00" in binary, the possible value of Yt[8:0] is between 0 and 127. Thus, the block 16 is moved to the position of the block 3 shown in FIG. 29A as the result of address conversion in the address conversion circuit 110. In the same manner, since X[9:8] of the block 17 is "01" in binary, Yt[8:7] is "01" in binary and the possible value of Yt[8:0] is between 128 and 255. Thus, the block 17 is moved to the position of the block 7 as the result of address conversion in the address conversion circuit 110. In the same manner, the block 18 is moved to the position of the block 11 after address conversion. As a result, all the blocks which cause an overflow are moved to free area in the storage area.

FIG. 28B shows the logical construction of another address conversion circuit 113 of the present embodiment which is realized by a logical circuit. The symbol "U" and "&" represent logical OR and logical AND, respectively. The circuit which generates Xt[9] is realized by an OR circuit which outputs 1 when either one of X[9] or Y[9] is 1. The circuit which generates Xt[8] is realized by an OR circuit which outputs 1 when either one of X[8] or Y[9] is 1.

The circuit which generates Yt[8] is realized by the first and second AND circuits and the first OR circuit. The first AND circuit outputs AND between the reverse output of Y[9] and Y[8]. The second AND circuit outputs AND between Y[9] and X[9]. The first OR circuit outputs AND between the output of the first AND circuit and the output of the second AND circuit. When Y[9] is not 1, Y[8] is outputted, and otherwise X[9] is outputted as Yt[8].

In the same manner, the circuit which generates Yt[7] is realized by the second OR circuit, and the third and fourth AND circuits. The third AND circuit outputs AND between the reverse output of Y[9] and Y[7]. The fourth AND circuit outputs AND between Y[9] and X[8]. The second OR circuit outputs AND between the output of the third AND circuit and the output of the fourth AND circuit. When Y[9] is not 1, Y[7] is outputted, and otherwise XE[8] is outputted as Yt[7]. Since the AND circuit and the OR circuit used in the address conversion circuit 113 are small in size and can be easily realized with programmable logic arrays (PLA) device, the storage area in the picture memory can be used efficiently at low cost.

If the address of a block outside the 768×640 pixel area such as block 3, 7, or 11 shown in FIG. 29A is inputted to the address conversion circuit 113, there is a problem that the address after the conversion indicates an address of a block included in the 768×640 pixel area. For example, although the pixel whose (X,Y) address is (900, 200) belongs to the block 7, the address (900, 200) of the block 7 remains the same after the address conversion. If the picture data of the block 17 are already written in the block 7, they are updated. To avoid this, all the blocks outside the 768×640 pixel area are assigned to the block 15 which is not used.

FIG. 28C shows the logical construction of the other address conversion circuit 114 of the present embodiment provided with (mask) generation circuit. The (mask) generation circuit outputs the logical OR among a logical AND between Y[9] and Y[8], a logical AND between Y[9] and Y[7], and a logical AND between X[9] and Y[8]. The logical AND between Y[9] and Y[8] becomes 1 when the Y address is 768 or larger. The logical AND between Y[9] and Y[7] becomes 1 when the Y address is 640 or larger. The logical AND between X[9] and X[8] becomes 1 when the X address of the blocks 3, 7, 11, and 15 is 768 or larger.

The address conversion circuit 114 generates the (mask) by detecting the address of a block outside the 768×640 pixel area, and ORs the (mask) and Yt[8:7], thereby making all the bits of Xt[9:8] and Yt[8:7] be 1. By generating the (mask), and ORing it with Yt[8:7], the address of a block outside a target area can be converted to the address of the block 15 which is not used.

Figures 30A, 30B:
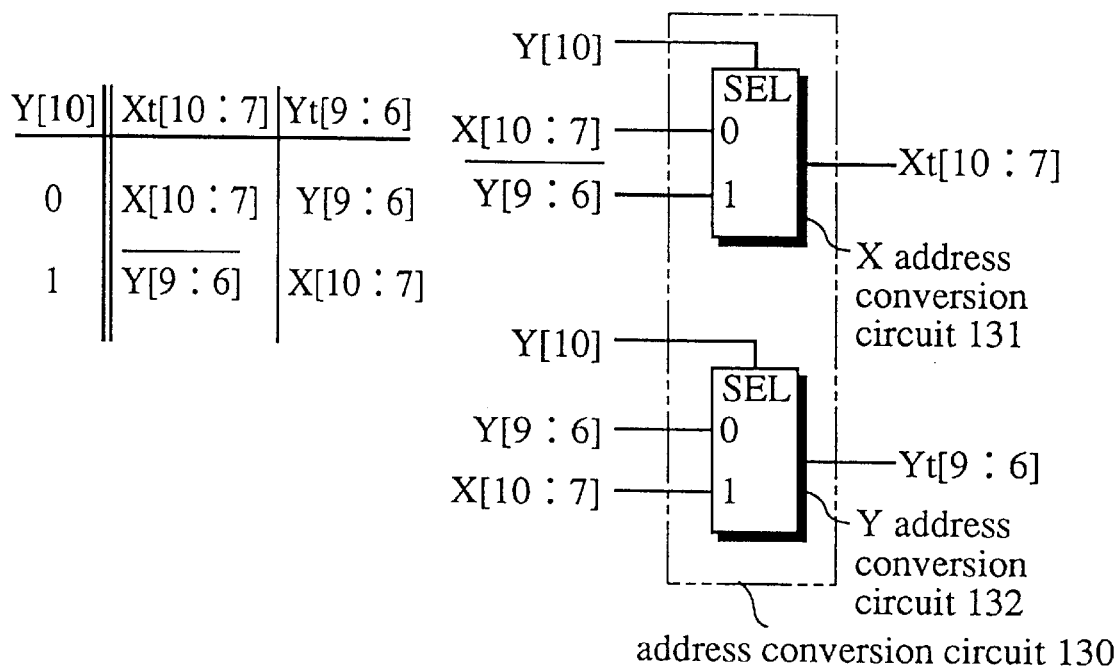
FIGS. 30A–30B show the construction of the address conversion circuit 130 and the address conversion circuit 133 of the third embodiment.
Figure 31:
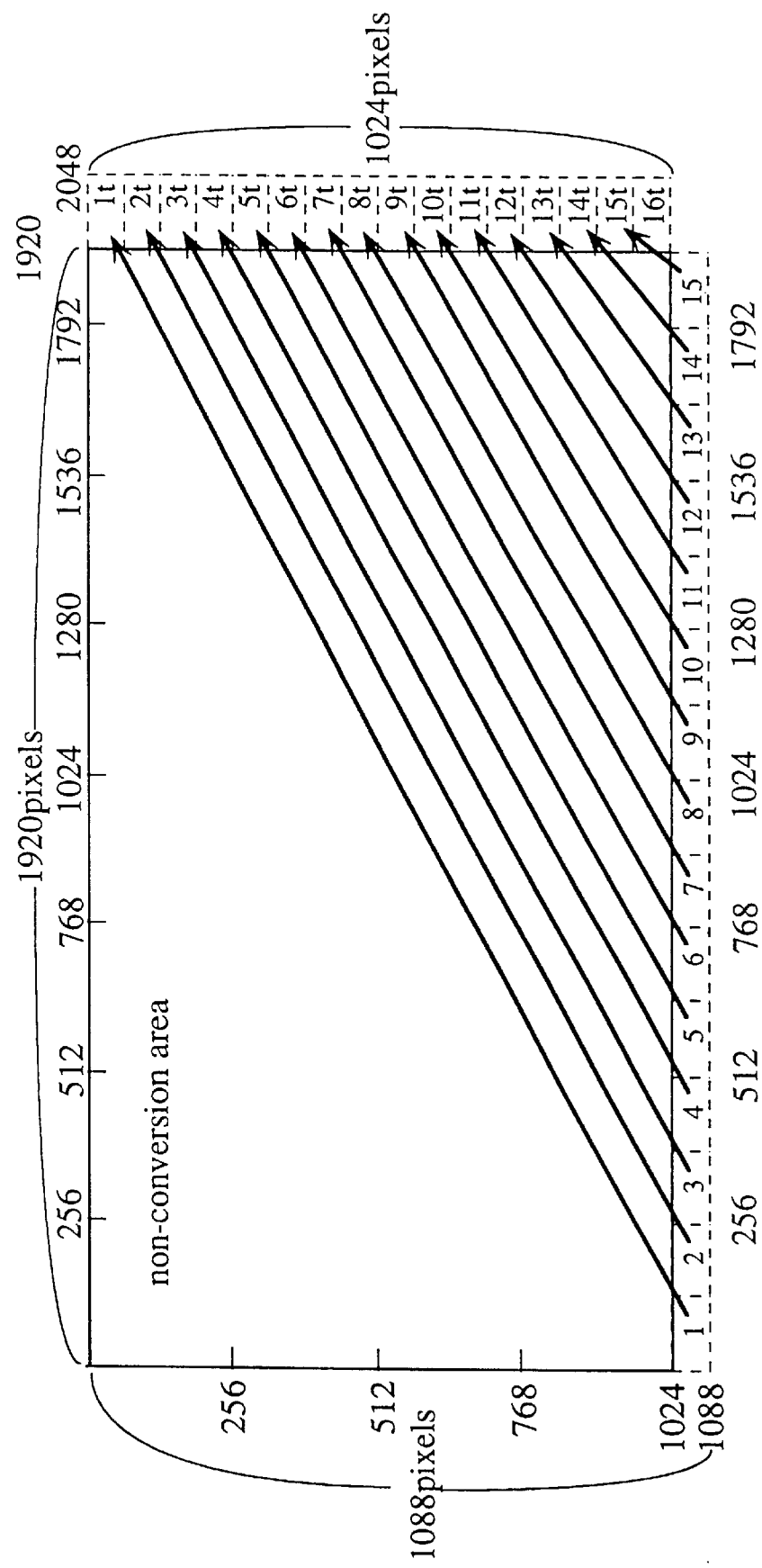
FIG. 31 shows the relationship between blocks before address conversion and after address conversion to be executed by the address conversion circuit 130.

FIGS. 30A show the construction of another address conversion circuit 130 of the present embodiment to be realized by a multiplexer and another address conversion circuit 133. FIG. 31 shows the relationship between blocks before address conversion and after address conversion to be executed by the address conversion circuit 130.

The address convention circuit 130 includes an X address conversion circuit 131 and a Y address conversion circuit 132. The X address conversion circuit 131 and the Y address conversion circuit 132 are realized by a multiplexer which uses Y[10] as a selection signal. The address conversion circuit 130 assigns picture data of 1920×1088 pixels to the actual storage area of 2048×1024 pixels in the picture data memory. Both the actual storage area and overflow picture data are divided into blocks each consisting of 128×64 pixels. The bits of an address which are actually converted by the address conversion circuit 130 is: (X[10:7],Y[10:6]) (Xt[10:7],Yt[9:6]). The X address conversion circuit 131 receives X[10:7], and the reverse output of Y[9:6]. The X address conversion circuit 131 selects X[10:7] when Y[10], which is a selection signal is 0, and selects the reverse output of ,Y[9:6] as Xt[10:7] when Y[10] is 1.

The Y address conversion circuit 132 receives Y[9:6], and X[10:7]. The Y address conversion circuit 132 selects Y[9:6] when Y[10] is 0, and selects X[10:7] as Yt[9:6] when Y[10] is 1.

Since the address conversion circuit 130 uses Y[10] as a selection signal, blocks whose Y address is 1024 or larger are address-converted. In the picture data of 1920×1088 pixels, the blocks numbered 1 to 15 are address-converted. The Y[10:0] of each of these blocks 1–15 is between 1024 and 1087, so that it never happens that a bit higher than the 6th bit becomes 1 except for the 10th bit. Consequently, the reverse output of Y[9:6] to be inputted to the X address conversion circuit 131 can be "1111" in binary, and as a result, Xt[10:0] of the blocks 1 to 15 is between 1920 and 2047.

As for the blocks 1 to 15, the Y address conversion circuit 132 selects X[10:7] as Yt[9:6]. The X[10:7] of the block 1 is "0000" in binary, so that Yt[9:6] becomes "0000", in binary, and the possible value of Yt[9:0] is between 0 and 127. In other words, the block 1 is moved to the position of the block 1*t* by the address conversion by the address conversion circuit 130 as shown in FIG. 31.

In the same manner, since X[10:7] of the block 2 is "0001" in binary, the Yt[9:6] becomes "0001" in binary and the possible value of Yt[9:0] is between 128 and 255. As a result, the block 2 is moved to the position of the block 2*t* after address conversion.

In the same manner, the block 3 is moved to the position of the block 3*t* after address conversion. Finally, each of the blocks 1 to 15 are positioned in the free area including the blocks 1*t*–16*t* after address conversion.

The address conversion circuit 130 of the present embodiment can be realized by the combination of an AND circuit and an OR circuit similar to the address conversion circuit 113 shown in FIG. 28B.

FIG. 30B shows the logical construction of the address conversion circuit 133 which is realized by a logical circuit provided with a (mask) generation circuit. The symbol "U" and "&" represent logical OR and logical AND, respectively. The circuit which generates Xt[10] is realized by an OR circuit which outputs 1 when either one of X[10] or Y[10] is 1. The circuit which generates Xt[9] is an OR circuit which outputs 1 when either one of X[9] and Y[10] becomes 1. The circuit which generates Xt[8] is an OR circuit which outputs 1 when either one of X[8] and Y[10] becomes 1. The circuit which generates Xt[7] is an OR circuit which outputs 1 when either one of X[7] and Y[10] becomes 1.

The (mask) generation circuit of the address conversion circuit 133 outputs the logical OR among a logical AND between Y[10] and Y[9], a logical AND between Y[10] and Y[8], a logical AND between X[10] and Y[7], a logical AND between Y[10] and Y[6], a logical AND among X[10], X[9], X[8], and X[7]. The logical AND between Y[10] and Y[9] becomes 1 in an area where the Y address is 1536 or larger. The logical AND between Y[10] and Y[8] becomes 1 in an area where the Y address is 1280 or larger. The logical AND between Y[10] and Y[7] becomes 1 in an area where the Y address is 1152 or larger. The logical AND between Y[10] and Y[6] becomes 1 in an area where the Y address is 1088 or larger. The logical AND among X[10], X[9], X[8], and X[7] becomes 1 in an area including the blocks 1*t* to 16*t* where the X address is 2048 or larger. Thus, the (mask) generation circuit detects addresses of an area outside the 1920×1088 pixel area.

The circuit which generates Yt[9] is realized by the combination of an OR circuit and an AND circuit. The OR circuit outputs OR among the AND between the reverse output of Y[10] and Y[9], the AND between Y[10] and X[10], and the (mask).

In the same manner, the circuit which generates Yt[8] is realized by the combination of an OR circuit and an AND circuit. The OR circuit outputs OR among the AND between the reverse output of Y[10] and Y[8], the AND between Y[10] and X[9], and the (mask).

The circuit which generates Yt[7] is realized by the combination of an OR circuit and an AND circuit. The OR circuit outputs OR among the AND between the reverse output of Y[10] and Y[7], the AND between Y[10] and X[8], and the (mask).

In the same manner, the circuit which generates Yt[6] is realized by the combination of an OR circuit and an AND circuit. The OR circuit outputs OR among the AND between the reverse output of Y[10] and Y[6], the AND between Y[10] and X[7], and the (mask). As a result, Xt[10:7] and Yt[9:6] can be realized by OR circuits, and AND-OR circuits, respectively. When the address conversion circuit 133 receives the address of a block outside the 1920×1088 pixel area and the (mask) becomes 1, Yt[9:6] becomes "1111", and as a result, the picture data of a block whose address is outside the 1920×1088 pixel area are written in the block 16*t* shown in FIG. 31.

In the system which never generates the address of a block outside the 1920×1088 pixel area, a (mask) generation circuit is unnecessary. Since the address conversion circuit 133 can be realized by the combination of an AND circuit and an OR circuit, whether a (mask) generation circuit is present or not, it is easily realized by a PLA device. In addition, the storage area of the picture memory can be efficiently used without expanding the scale of the circuit.

Figure 32:
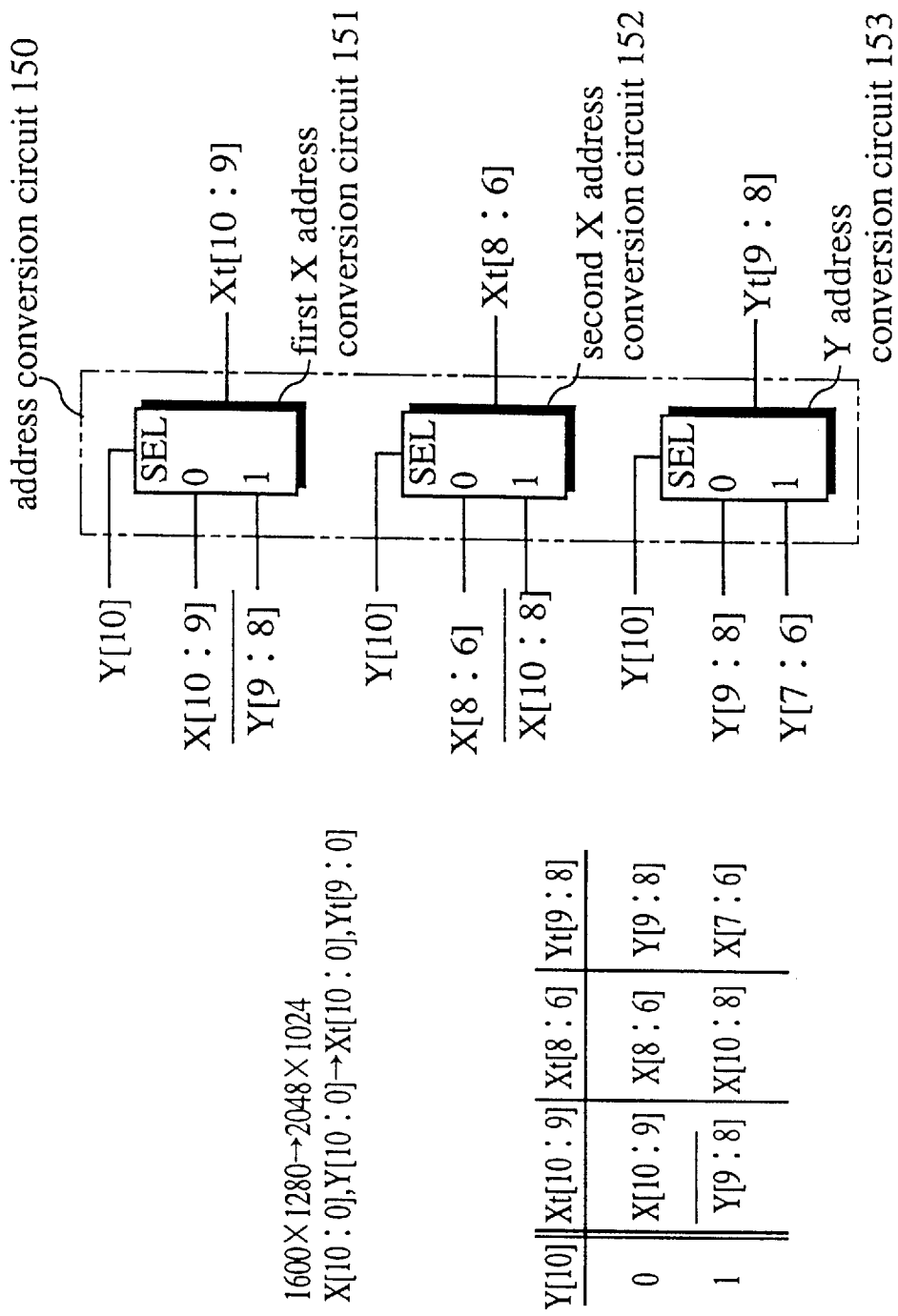
FIG. 32 shows the construction of the address conversion circuit 150 which is realized by a multiplexer.
Figure 33:
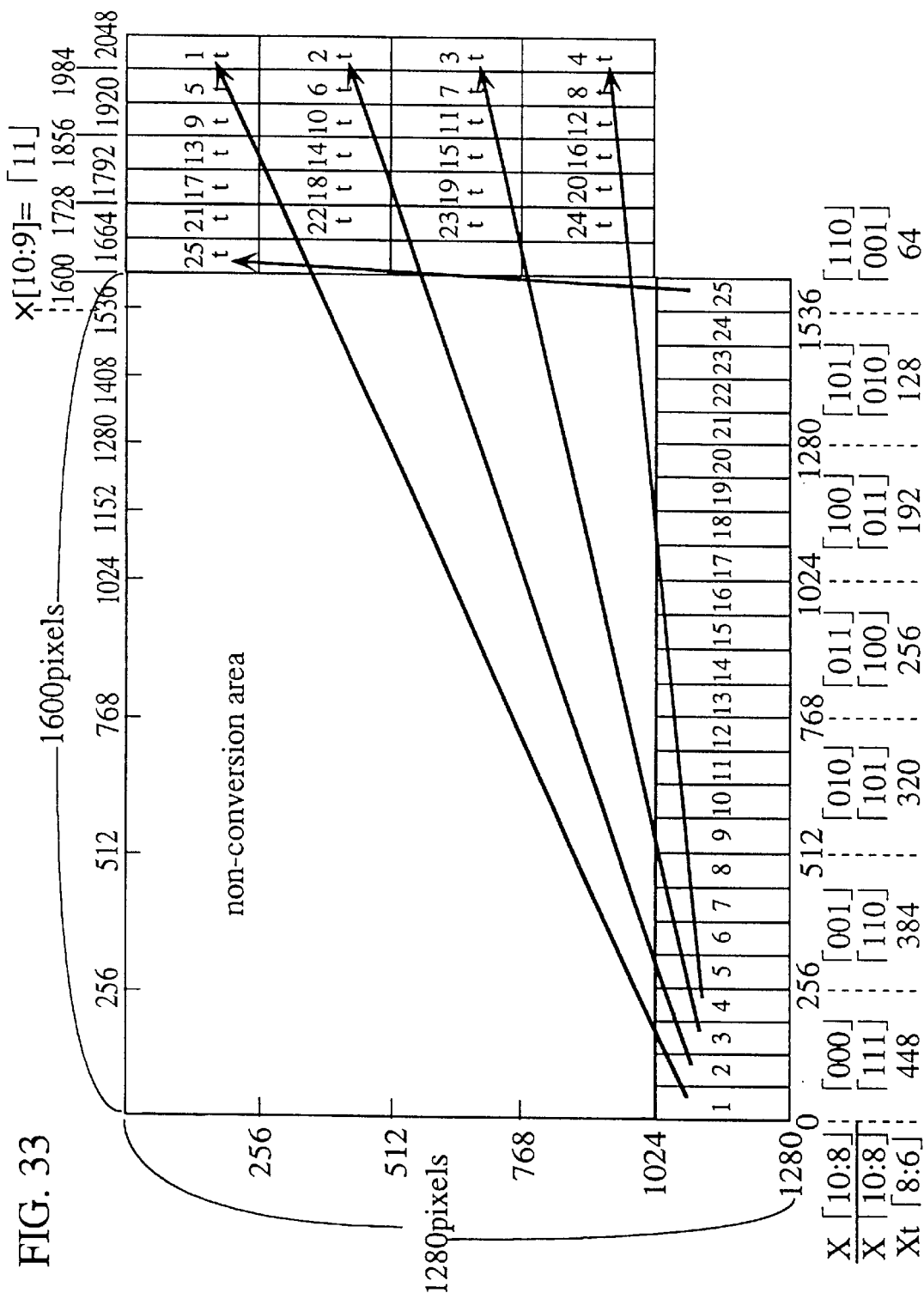
FIG. 33 shows the relationship between blocks before address conversion and blocks after address conversion.

FIG. 32 shows the construction of the address conversion circuit 150 which is realized by a multiplexer, and FIG. 33 shows the relationship between blocks before address conversion and blocks after address conversion. The address conversion circuit 150 includes a first X address conversion circuit 151, a second X address conversion circuit 152, and a Y address conversion circuit 153. Each of the first X address conversion circuit 151, the second X address conversion circuit 152, and the Y address conversion circuit 153 is realized by a multiplexer which uses Y[10] as a selection signal. The address conversion circuit 150 assigns picture data of 1600×1280 pixels to the actual storage area of 2048×1024 pixels in the picture data memory. The actual storage area is divided into blocks each consisting of 64×256 pixels. The bits of an address which are actually converted by the address conversion circuit 150 is: (X[10:6], Y[10:8])→(Xt[10:6], Yt[9:8]).

The first X address conversion circuit 151 receives X[10:9], and the reverse output of Y[9:8]. The first X address conversion circuit 151 selects X[9:8] when Y[10], which is a selection signal is 0, and selects the reverse output of Y[9:8] as Xt[10:9] when Y[10] is 1. In the blocks 1–25 where Y[10] is 1, Y[9:8] is "00". so that Xt[10:9] becomes "11". Consequently, the blocks 1–25 are positioned in an area whose X address is 1536 or larger.

The second X address conversion circuit 152 receives X[8:6], and the reverse output of Y[10:8]. The second X address conversion circuit 152 selects X[8:6] when Y[10] is 0, and selects the reverse output of X[10:8] as Xt[8:6] when Y[10] is 1.

In the blocks 1–25 where Y[10] is 1, X[10:8] of the block 1 is "000", and X[10:8] of the block 5 is "001". In the same manner, X[10:8] of the block 9 is "010", and X[10:8] of the block 13 is "011". The X[10:8] of the block 17 is "100", X[10:8] of the block 21 is "101", and X[10:8] of the block 25 is "110". The reverse outputs of them in the blocks 1, 5, 9, 13, 17, 21, and 25 are "111", "110", "101", "100", "011", "010", "001", respectively.

Thus, Xt[8:6] of the blocks 1–4 are made "111" by the second X address conversion circuit 152. In the same manner, Xt[8:6] of the blocks 5–8, 9–12, 13–16, 17–20, 21–24, and 25 are made "110", "101", "100", "011", "010", and "001", respectively. As a result, the blocks 1–4 are positioned in an area where Xt[10:6]="11111", that is, its decimal conversion X address is larger than 1984 (=1536+ 448). In the same manner, the blocks 5–8, 9–12, 13–16, 17–20, 21–24, and 25 are positioned in areas where Xt[10:6] are between 1920 and 1983, between 1856 and 1919, between 1792 and 1855, between 1728 and 1791, between 1664 and 1727, and between 1600 and 1660, respectively.

The Y address conversion circuit 153 receives Y[9:8] and X[7:6]. The Y address conversion circuit 153 selects Y[9:8] when Y[10] is 0, and selects X[7:6] as Yt[9:8] when Y[10] is 1. Consequently, in the blocks 1, 5, 9, 13, 17, 21, and 25 whose X[7:6] is "00", Yt[9:8] becomes "00", which means these blocks are positioned in an area whose conversion Y address is between 0 and 255.

In the same manner, each block whose X[7:6] is "01" is positioned an area whose conversion Y address is between 256 and 511, each block whose X[7:6] is "10" is positioned an area whose conversion Y address is between 512 and 767, and each block whose X[7:6] is "11" is positioned an area whose conversion Y address is between 768 and 1023. As a result, after the address conversion by the address conversion circuit 150, the blocks 1–25 shown in FIG. 33 are moved in the positions of blocks 1t–25t, respectively.

The following is an explanation of address conversion in comparison with the PAL format shown in FIG. 29. When the resolutions of inputted picture in the X address direction and the Y address direction are expressed by p pixels and q pixels respectively in the following equation (p and q are positive integers):

$$p = 2^{s-i} \times (2^i - k)$$

$$q = 2^{t-j} \times (2^{j-1} - k)$$

$$(2^i - k) = 2^j \times k - 1$$

The area of p×q pixels is divided into $(2^i-k) \times (2^{j-1}+1)$ blocks each consisting of $2^{s-i} \times 2^{t-j}$, and picture memory of $2^s \times 2^{t-1}$ is divided into $2i \times 2^{j-j}$ blocks (i, j, and k are positive integers).

In the PAL format shown in FIG. 29, p=720 and q=576, and each block has $2^{s-i}$ (=256) pixels in the X address direction and $2^{t-j}$ (=128) pixels in the Y address direction when K=1, i=2, and j=2.

The picture area of $p \times 2^{t-1}$ pixels whose Y address is smaller than $2^{t-i}$ is assigned to the picture memory without being subjected address conversion, and $(2^j-K)$ blocks whose Y address is larger than $2^{t-1}$ are assigned to $k \times (2^{t-j})$ blocks which are not assigned blocks whose Y address is smaller than $2^{t-1}$.

As explained hereinbefore, in the present embodiment, constructing an address conversion circuit by a multiplexer or a logical circuit makes it possible that the storage areas in the picture data memory are used efficiently with a simple construction and without enlarging the circuit size. In addition, the use of PLA device as the logical circuit provides a highly productive address conversion circuit.

Although the picture data memory, the motion vector detection circuit, and the address conversion circuits of the present invention are explained in different embodiments from each other, the address conversion circuits and the picture data memory may be provided within the same motion vector detection circuit. In this case, the address conversion circuits of the third embodiment are provided between the address generation circuit and the bank selection circuit, thereby making it possible to use the storage area of the memory efficiently and to provide a picture data memory which can read picture data efficiently and speedily with a simple construction. The provision of such a picture data memory allows the provision of a motion vector detection circuit which exhibits precise detection of motion vectors in telescopic search which requires high-speed access to the reference picture data memory.

In the motion vector detection circuit of the present invention, the method of determining a search area is not limited to the method explained in the embodiment. To be more specific, a search block does not have to be the same position as a search unit, and the search area does not have to be the size as determined in the embodiment.

The use of the picture data memory of the present invention is not limited to the reference picture data memory of a motion vector detection circuit, but is used as a general picture data memory and its control circuit, in order to improve the readout efficiently of picture data, to speed up the memory operation, to simplify the memory control circuit, and to improve the utilization factor of the storage areas in the memory.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A motion vector detection circuit for, (i) when two pictures each consisting of a plurality of equal-size blocks are referred to as a target picture and a reference picture, (ii) when one of the plurality of equal-size blocks of the target picture is referred to as a search unit, and (iii) when blocks which are located in predetermined positions in the plurality of equal-size blocks of the reference picture are referred to as a search area, detecting a motion vector between the search unit and the search area, said motion vector detection circuit comprising:

a buffer for temporarily storing a predetermined amount of inputted picture data of the reference picture;

a reference picture data memory for storing picture data corresponding to at least one reference picture;

a search area determination means for determining the search area of every search unit in a target picture, a determining operation proceeding from one block to an adjacent block in the target picture;

a search area memory for storing picture data of the search area determined by said search area determination means;

a first reference picture data write means for reading picture data of a block which belongs to the determined search area and which does not belong to a search area of a preceding search unit from said buffer and writing the read picture data to said reference picture data memory and said search area memory;

a second reference picture data write means for reading picture data of a block which belongs to the determined search area and which has already been read from said buffer as part of a search area from said reference picture data memory and writing the read picture data to said search area memory; and a motion vector detection means for searching a search area stored in said search area memory for a block which has a smallest difference with a search unit and detecting a motion vector between the search unit and the searched block.

2. The motion vector detection circuit of claim 1 further comprising:

a first write control means for suspending an operation of said first reference picture data write means when a first target picture and a second target picture are consecutive in time and have a same reference picture, when a motion vector between the first target picture and the reference picture is already detected, and when a motion vector between the second target picture and the reference picture is going to be detected, wherein said search area determination means determines a search area of each search unit in the second target picture in accordance with a motion vector which has already been detected for a corresponding block in the first target picture.

3. A motion vector detection circuit for, (i) when two pictures each consisting of a plurality of equal-size blocks are referred to as a target picture and a reference picture, (ii) when one of the plurality of equal-size blocks of the target picture is referred to as a search unit, and (iii) when blocks which are located in predetermined positions in the plurality of equal-size blocks of the reference picture are referred to as a search area, detecting a motion vector between the search unit and the search area, said motion vector detection circuit comprising:

a buffer for receiving picture data of the reference picture based on a write address consisting of an X address and a Y address corresponding to one or more pixels, and temporarily storing a predetermined amount of the picture data;

a reference picture data memory including a first storage area and a second storage area which are accessed independently of each other and which have a memory capacity corresponding to at least one reference picture;

a search area determination means for determining the search area of every search unit in a target picture, a determining operation proceeding from one block to an adjacent block in the target picture;

a search area memory for storing picture data of the search area determined by said search area determination means;

a buffer readout means for reading picture data of a block which belongs to the determined search area and which does not belong to a search area of a preceding search unit from said buffer;

a reference picture data write means for (i) writing picture data which have a same Y address and consecutive X addresses to the first storage area and the second storage area alternately every predetermined length, said predetermined length causing no overhead in accessing the first storage area and the second storage area, the picture data being selected from the picture data read by said buffer readout means, and for (ii) writing picture data of said predetermined length which have a same X address and adjacent Y addresses to different storage areas from each other;

a first search area write means for writing picture data of a block which have been written by said reference picture data write means to said reference picture data memory;

a section specification means for specifying a section in each block of a determined search area, the section having a width of an odd number of said predetermined length in an address area of the read address, and including picture data having a same Y address, the block has already been read from sad buffer and written in said reference picture data memory, the block specification of the section being executed for every other Y address;

a reference picture data read means for reading picture data of the section specified by said section specification means from the first storage area and the second storage area alternately;

a second search area write means for writing picture data of the block which have been read from said reference picture data memory by said reference picture data read means; and a motion vector detection means for searching a search area stored in said search area memory for a block which has a smallest difference with a search unit and detecting a motion vector between the search unit and the searched block.

4. The motion vector detection circuit of claim 3 wherein said buffer is a first-in first-out memory.

* * * * *